US011845676B2

(12) United States Patent
Pentecost et al.

(10) Patent No.: US 11,845,676 B2
(45) Date of Patent: Dec. 19, 2023

(54) TRANSITIONAL WATER TREATMENT WALL FOR DIALYSIS

(71) Applicant: PHS SOLUTIONS LLC., Ludlow Falls, OH (US)

(72) Inventors: Randy J. Pentecost, Central City, KY (US); Bryan S. Hall, Salyersville, KY (US); Fred A. Sink, Ludlow Falls, OH (US)

(73) Assignee: PHS SOLUTIONS LLC., Ludlow Falls, OH (US)

( * ) Notice: Subject to any disclaimer, the term of this patent is extended or adjusted under 35 U.S.C. 154(b) by 0 days.

(21) Appl. No.: 17/860,732

(22) Filed: Jul. 8, 2022

(65) Prior Publication Data

US 2023/0010733 A1   Jan. 12, 2023

Related U.S. Application Data

(60) Provisional application No. 63/219,433, filed on Jul. 8, 2021.

(51) Int. Cl.
   *C02F 1/44* (2023.01)

(52) U.S. Cl.
   CPC .......... *C02F 1/44* (2013.01); *C02F 2201/004* (2013.01); *C02F 2201/005* (2013.01)

(58) Field of Classification Search
   CPC ........ B01D 61/10; B01D 61/12; B01D 61/30; B01D 61/32; B01D 2311/14; C02F 2209/03
   USPC ......................................................... 210/741
   See application file for complete search history.

(56) References Cited

U.S. PATENT DOCUMENTS

| 5,591,344 A * | 1/1997 | Kenley ............... A61M 1/3647 |
| | | 210/764 |
| 10,696,575 B1 * | 6/2020 | Pyle .......................... C02F 9/00 |
| 2017/0081228 A1 * | 3/2017 | Avakian ................. B01D 61/18 |

OTHER PUBLICATIONS

Nephrology On-Demand, Water in Dialysis, https://medium.com/@nephondemand/water-in-dialysis, Oct. 7, 2015, 6 pgs., USA.
Tong, M.K. et al., Water treatment for hemodialysis, Hong Kong Journal of Nephrology, 2001, pp. 7-14, 3(1), Denver, Colorado, USA.
Pmmag, Kidney Dialysis Facilities And Plumbing Systems, https://www.pmmag.com/articles/89246-kidney-dialysis-facilities-and-plumbing-systems, Oct. 1, 2005, 2 pgs., USA.
Agar, J.W.M. et al, 8 Home Hemodialysis: Infrastructure, Water, and Machines in the Home, ISHD International Society For Hemodialysis, pp. 1-23, Denmark.

(Continued)

*Primary Examiner* — Benjamin M Kurtz
(74) *Attorney, Agent, or Firm* — STANDLEY LAW GROUP LLP; Bryan Finneran; Jeffrey Norris

(57) ABSTRACT

A transitional water treatment wall for kidney dialysis is provided. The transitional wall includes several devices positioned on a mobile frame, the devices establishing fluid communication between a water source, pre-RO treatment equipment, and an RO system. The transitional water treatment wall also provides pressure and temperature control of the water being circulated. The mobile frame of the transitional water treatment wall includes wheels for providing ease of movement of the transitional water treatment wall. The mobile frame also limits space requirements for the various devices. The transitional wall also includes electrical outlets.

18 Claims, 19 Drawing Sheets

(56) References Cited

OTHER PUBLICATIONS

BC Provincial Renal Agency, Dialysis Water Treatment Equipment Monitoring, Provincial Standards & Guidelines, Dec. 2017, 10 pgs., Vancouver, BC.

Kasparek, T. et al., What Medical Directors Need to Know about Dialysis Facility Water Management, American Society of Nephrology, Jun. 2015, pp. 1061-1071, vol. 10, Denver, CO., USA.

Fresenius Renal Technologies, Liberty PDX™ united with staysafe®, Liberty PDx Cycler User's Guide, 2014, 2016, 256 pgs., Concord, CA., USA.

\* cited by examiner

TRANSITIONAL WATER TREATMENT WALL FOR DIALYSIS

CROSS-REFERENCE TO RELATED APPLICATIONS

This application is entitled to the benefit of a right of priority to U.S. Provisional Patent Application No. 63/219,433, filed on Jul. 8, 2021. The content of that application is hereby incorporated by reference in its entirety as if fully recited herein.

TECHNICAL FIELD

Embodiments of the present disclosure relate to a transitional water treatment wall beneficial for dialysate production for kidney dialysis. More particularly, embodiments relate to a mobile frame having a plurality of devices secured thereto, the devices collectively completing a water treatment circuit between a water source output and a reverse osmosis ("RO") treatment system input.

BACKGROUND OF THE INVENTION

Kidney failure and reduced kidney function, for example from end stage renal disease, have been treated with a process called "dialysis" or "kidney dialysis." Dialysis is a life sustaining treatment which millions of patients have benefited from. Dialysis removes waste, toxins, excess salt, and excess water from the body that otherwise would have been removed by normal functioning kidneys. The waste, toxins, excess salt, and excess water are transferred from blood to a body-temperature dialysis solution called "dialysate" by filter and membrane action of a dialyzer or other dialysis equipment. Dialysate may be produced by proportionally mixing purified water with acid and base concentrates and electrolytes, such as from one or more commercially available dialysis fluid concentrates, and thereafter warming, deaerating, and pressuring the mixture for circulation to a dialyzer or other dialysis equipment. Significant volumes of dialysate may be used during dialysis, thus significant volumes of purified water must be prepared for dialysis.

It is imperative that the purified water prepared for dialysate production does not contain impurities such as pathogens, metals, sediment, endotoxins, chemicals or other contaminants. Such impurities, if present in the dialysate, may be transferred to a patient's bloodstream, causing disease or other injury to the patient. Stringent regulatory standards, for example, ANSI Standard RD62, may govern chemical and microbiological standards for purified water to be used for kidney dialysis. A water purification system for kidney dialysis may provide water for dialysate production, where levels of contaminants in the water are preferably kept below recommended or required limits.

A traditional water purification system for kidney dialysis may include a water supply in fluid communication with one or more of iron remover(s), particle filter(s), water softener(s), and/or carbon filter(s) (independently or collectively "pre-RO treatment equipment"). The pre-RO treatment equipment may be in fluid communication with a reverse osmosis system ("RO system"), where the RO system may include at least one reverse osmosis filter apparatus. Specifically, water may be circulated through the pre-RO treatment equipment, where the pre-RO treatment equipment may substantially remove certain contaminants from the water ("pre-RO treated water"). The pre-RO treated water may be circulated through the RO system, where the RO system may substantially remove remaining ionic and microbiological contaminants, including but not limited to bacteria, endotoxins, viruses, salts, particles and dissolved organic substrates from the water ("purified water" or "RO treated water"). The purified water may be mixed with acid and base concentrates and electrolytes to form dialysate. A central distribution system may distribute the dialysate to one or more dialysis stations.

Although traditional water purification systems for kidney dialysis have demonstrated success in substantially removing contaminants from water to be used for dialysate production, there have been numerous issues related to installation, maintenance, operation efficiency, safety, and sampling requirements of the traditional systems. With the traditional systems, various tanks, pipes, valves, and the like ("prior system devices") must be provided to complete a fluid series between a water source, pre-RO treatment equipment, and the RO system. The prior system devices arrive at a site of installation as independent parts, and these parts must be installed separately, such as by affixing the independent parts to other pipes, apparatuses, rails, walls or the like to establish fluid communication between the various apparatuses defining the pre-RO treatment equipment, and to maintain structural integrity of the series. Dialysis facility operators and/or contractors thereof often devote extensive time, money, and labor to having these installations completed and/or having parts repaired or removed. The independent parts are often numerous and heavy, and may include complex installation features and/or mechanisms. Thus, transportation, installation, repair and/or removal of these parts may require significant physical labor from multiple physically-fit individuals and/or individuals who are sophisticated in the area of water treatment plumbing.

Regular inspection and maintenance of a water treatment system for dialysis is necessary to ensure a smooth, consistent flow path between the water source and water treatment output. The presence of faulty equipment and/or obstructed flow paths, such as, for example not by way of limitation, faulty equipment and/or obstructed flow paths caused by pressure or temperature issues, could lead to, for example by way of illustration and not limitation, leaks, equipment failure, the buildup of biofilms, and/or the propagation of pathogens in the system. With the traditional systems, the prior system devices are often difficult to inspect, reconfigure, repair and/or replace as a result of their size, weight and/or confinement by their proximity to other immobilized objects. For example, by way of illustration and not limitation, it may be difficult for a user to inspect system valves where other immobilized objects, such as but not limited to pipes and tanks, obstruct the user's access to the valves, and the user does not individually have the ability to move or adjust said pipes and tanks to create an improved inspection pathway to the valves.

Additionally, with water treatment systems for dialysis, sampling at various stages of the treatment process may be necessary to ensure that water treatment equipment is operating properly, and certain regulatory recommendations and/or requirements are being satisfied. Prior water treatment systems for dialysis lack a single location sampling unit, where the single location sampling unit may provide samples of water from most or all relevant stages of water treatment. Furthermore, certain component parts of a water treatment systems for dialysis require an electricity supply. Traditional systems may be spatially limited by the location of one or more outlets in a dialysis treatment facility. The use of power cords may not be permitted due to safety or power usage requirements. In addition, prior systems may require more space than optimal, since prior system devices are not substantially oriented within and/or in close proximity to a single vertical plane.

In view of this, it would be helpful to develop a transitional water treatment wall for kidney dialysis ("transitional water treatment wall" or "transitional wall"), wherein the transitional wall may establish fluid communication between a water source, pre-RO treatment equipment, and an RO system, and is optimized for mobility and system control.

SUMMARY OF THE INVENTION

It is an object of the present invention to provide a transitional wall having exemplary devices positioned on an exemplary mobile frame, wherein certain devices may establish fluid communication between a water source, pre-RO treatment equipment, and an RO system. The devices may further provide pressure and temperature control of the water being treated. Monitoring and controlling water pressure and temperature, as well as monitoring the equipment dictating water pressure and temperature, may be necessary to prevent shutdown or improper operation of water treatment equipment. Exemplary devices positioned on an exemplary mobile frame having a plurality of wheels may include but are not limited to one or more exemplary sampling stations, tempering devices for controlling water temperature, booster pumps for controlling water flow rate, pressure tanks, pipes, hoses, valves, electrical outlets, pressure gages, sampling tubes, temperature monitors, and the like (independently or collectively "transitional wall devices"). The transitional wall may take up less space than the totality of prior system devices in a traditional system, because exemplary transitional wall devices may be positioned within and/or in close proximity to a single vertical plane defined by the exemplary mobile frame.

Furthermore, the time, money, and labor costs of transportation, installation and/or removal of exemplary transitional wall devices may be substantially reduced with respect to prior system devices. Exemplary transitional wall devices may be positioned on the exemplary mobile frame before the transitional wall is transported to or from a destination, such as but not limited to a dialysis treatment facility. Thus, the transitional wall may arrive at the destination ready for attachment to a water source input, pre-RO treatment equipment, and an RO system output without the need for other installation efforts at the destination before said attachment. The wheels on an exemplary mobile frame may provide for ease of movement of the entire transitional wall. For example, by way of illustration and not limitation, the wheels may permit the transitional wall to be pushed by as few as one individual from a shipping container at a loading dock to a water treatment room at a dialysis treatment facility. Thereafter, as few as one individual may connect pipes, hoses, wires, plugs, or the like from the pre-RO treatment equipment, water source, and RO system to respective parts of the transitional wall to establish fluid communication between the water source, pre-RO treatment equipment, and RO system, as well as to establish pressure and temperature control of the water being treated and transported therethrough. Completing the aforementioned connections may be a simple, user-friendly process, therefore extensive knowledge of water treatment plumbing devices and fixtures on the part of as few as one individual may not be required.

The mobility of exemplary transitional walls may further provide for ease of continuous monitoring and/or maintenance of transitional wall devices. For example, by way of illustration and not limitation, an exemplary transitional wall may be repositioned away from several tanks obstructing a user's access to one or more transitional wall pipes, and thereafter the user may inspect, repair and/or replace pipes as necessary. Thus, maintenance, transportation, installation, and removal issues with respect to prior systems have been resolved.

It is a further objective of the present invention to provide a transitional wall including a sampling station where samples of water from most or all stages of treatment may be discharged from respective spigots or faucets positioned on a station frame. Each spigot or faucet may be in fluid communication with at least one water source, transitional wall device, pre-RO treatment equipment device, or the like, and configured to discharge water from said water source, transitional wall device, pre-RO treatment equipment device, or the like. With prior systems, sample monitoring with respect to various stages of water treatment generally involved engaging a sampling spigot positioned at or in close proximity to a tank, pipe, or related apparatus containing water from the relevant stage of treatment. Access to the prior sampling spigot may be obstructed by prior system devices and/or related equipment. With exemplary embodiments of the present invention, a user may readily obtain samples from most or all stages of treatment from a single sampling station accessible from a user standing area.

It is yet a further objective of the present invention to provide a transitional wall having a plurality of electrical outlets. The outlets may be positioned at various locations along the upper frame, the lower frame, and/or the interior frame. One or more transitional wall devices, pre-RO treatment equipment devices, RO system devices, or the like may establish electrical communication with a power source through one or more transitional wall electrical outlets. Thus, prior art issues with spatial limitations caused by wall outlet availability limitations and/or safety or power use limitations with respect to power cords have been resolved.

With the above objectives in view, the present invention discloses transitional water treatment wall for dialysate production for kidney dialysis. In exemplary embodiments of the present invention, the transitional wall comprises at least one mobile frame, water source input, tempering devices, booster pump, pressure gage, sampling station, pressure tanks, sampling tubes, transition pipes, and power outlets, and pre-RO treated water output.

According to the present invention in one aspect, a transitional wall may comprise a plurality of transitional wall devices positioned on a mobile frame. The mobile frame may comprise an upper frame, a lower frame having a plurality of wheels positioned on bottoms of side edges thereof, and an interior frame. A plurality of electrical outlets may be positioned along portions of the mobile frame. The various electrical outlets may be electronically connected to a circuit breaker, and the circuit breaker may be electronically connected to a power supply. The plurality of electrical outlets may be configured to supply electricity to one or more water treatment devices or apparatuses.

The transitional wall may further comprise at least one cold-water input pipe and at least one hot-water input pipe. The source of cold water may be municipal water. The source of hot water may be a hot water tank configured to heat municipal water to a higher temperature than the temperature of the cold water. A tempering device may be configured to mix cold water with hot water to achieve an optimal water temperature for proper water treatment equipment operation. A temperature monitor or thermometer may be configured to detect water temperature at one or more locations within the transitional wall devices. Where water temperature at one or more locations within the transitional wall devices falls outside a desired temperature range, the tempering device and/or a user controlling the tempering device may adjust the proportion of hot water to be mixed with cold water until a water temperature within the desired range is achieved.

The transitional wall may further comprise at least one pump configured to distribute water through transitional wall devices and pre-RO treatment equipment. At least one pump may be a booster pump. In certain embodiments, the booster pump is positioned downstream of the tempering device. In other embodiments, the booster pump is positioned upstream of the tempering device. In yet other embodiments, a separate pump may be configured to pump water from a tempering device to a booster pump. One or more valves may be configured to permit at least one user to change the flow rate of water from the cold-water source and/or the hot water source to the tempering device. One or more valves may be configured to permit at least one user to change the flow rate of water downstream and/or upstream of the booster pump.

Water pressure outside an optimal pressure range may cause leaks, ruptures and/or improper water treatment equipment operation. One or more water pressure gages may be configured to detect water pressure at one or more locations within the transitional wall devices. One or more pressure tanks may be configured to provide compressed fluid to increase water pressure where water pressure according to at least one pressure gage falls below a desired pressure range. The one or more pressure tanks may be in electric communication with at least one outlet positioned on the frame of the transitional wall. One or more relief valves may be configured to provide one or more discharge points to decrease water pressure where water pressure according to at least one pressure gage raises above a desired pressure range.

Pre-RO treatment equipment may be positioned downstream of the booster pump. Transition pipes of the transitional wall may establish fluid communication between pre-RO treatment equipment. The transitional wall may be configured to transfer water treated by pre-RO treatment equipment to a pre-RO treated water output. The various transition pipes may include valves for controlling flow rate. The pre-RO treated water output may be configured to connect to a water purification system input, preferably an RO system input. Pre-RO treated water distributed from the transitional wall to the RO system may be further treated by reverse osmosis, deionization, endotoxin filtering, some combination thereof, or the like, and thereafter purified water may be mixed with acid and base concentrates, electrolytes, some combination thereof, or the like to form dialysate.

The transitional wall may further comprise a plurality of sampling tubes, where each sampling tube may establish fluid communication between one or more transition pipes and one or more sample faucets of a water sampling station. One or more water pressure gages may provide measurement of water pressure in one or more transition pipes, sampling tubes, and the like. Each sample faucet may include a valve permitting a user to control flow rate of water being discharged from said valve. A drainage basin may cause any water discharged from a sample faucet and not collected by a user to be transported to a drain, collection bucket, drainage pipe, or the like for removal from the water treatment system. The water sampling station may be in communication with one or more processors.

BRIEF DESCRIPTION OF THE DRAWINGS

Novel features and advantages of the present invention, in addition to those expressly mentioned herein, will become apparent to those skilled in the art from a reading of the following detailed description in conjunction with the accompanying drawings. The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EXEMPLARY EMBODIMENT(S)

Figure 1:
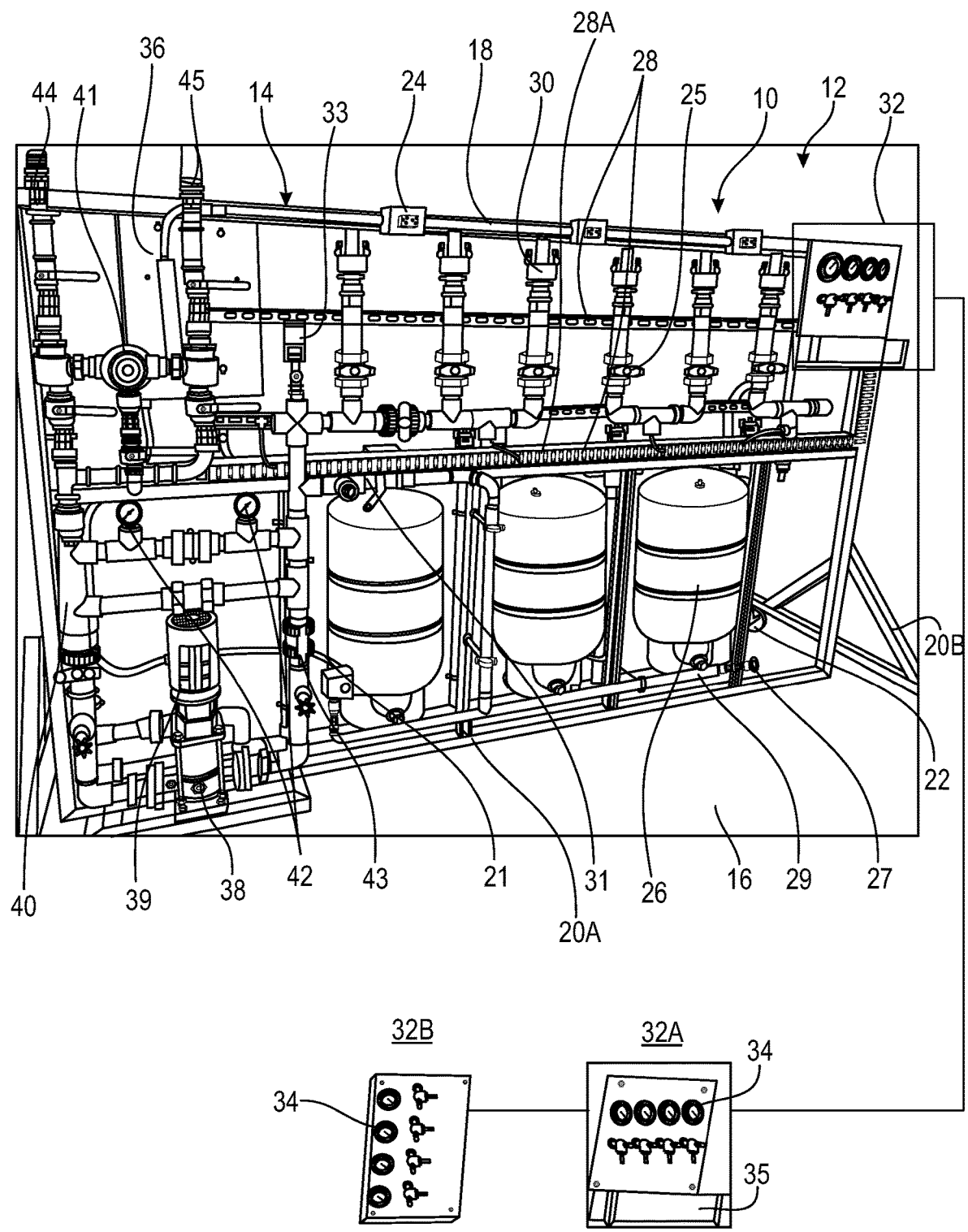
FIG. 1 is a front perspective view of an exemplary transitional water treatment wall for dialysis, the transitional water treatment wall including a water sampling station.

Referring now to FIG. 1, an exemplary transitional water treatment wall for dialysis 10 is shown. In certain preferred embodiments, the transitional wall 10 may be located in an equipment room 12 at a dialysis center. In other embodiments, the transitional wall 10 may be located in a mechanical room of a residential building, such as but not limited to the mechanical room of a house. It will be understood by one of ordinary skill in the art that there may be any number of locations where exemplary transitional walls may be configured for use with dialysis water treatment.

The transitional wall 10 may comprise a mobile frame 14, the mobile frame 14 including an upper frame 18, an inner lower frame 20A, an outer lower frame 20B and an interior frame 28. In the particular embodiment shown, the mobile frame 14 comprises structural steel. In other embodiments, the mobile frame 14 may comprise aluminum. It will be understood by one of ordinary skill in the art that any number of materials may be used to form various beams of the mobile frame 14. Bottom sides of the outer lower frame 20B may include a plurality of wheels 22 attached thereto, where the wheels 22 are positioned between a floor 16 and the bottom sides of the outer lower frame 20B. The floor 16 may comprise water resistant material. The floor 16 may include at least one drain.

The interior frame 28 may be configured to provide rigid support to the upper frame 18 and inner lower frame 20A to prevent the upper frame 18 and inner lower frame 20A from buckling, warping, twisting or the like under the weight of certain transitional wall devices or related devices, equipment or objects. Specifically, the interior frame 28 may include a plurality of horizontal and vertical beams, such as but not limited to a central horizontal beam 28A, for directing force from the weight of certain transitional wall devices or related devices, equipment or objects to nodes to ensure static equilibrium of the mobile frame 14. In the particular embodiment shown, the nodes comprise welded joints. In other embodiments, the nodes may comprise bolted joints. It will be understood by one of ordinary skill in the art that there may be any number of different ways to affix certain beams of the mobile frame 14 to one another to form nodes.

The outer lower frame 20B may comprise at least two separate side regions, where each side region may be located on an opposite side of the inner lower frame 20A with respect to the other side region. Each outer lower frame 20B side region may comprise at least one truss for providing base support to the mobile frame 14, including but not limited to support for preventing the mobile frame 14 from tipping over, such as from uneven mass distribution across the upper frame 18, interior frame 28, and/or inner lower frame 20A. In the particular embodiment shown, each outer lower frame 20B side region comprises a king post truss, where a common vertical beam is shared between the outer lower frame 20B and inner lower frame 20A. The vertical beam may provide rigid support to angled and base beams of the outer lower frame 20B, preventing the outer lower frame 20B from buckling, warping, twisting or the like under the weight of the upper frame 18, interior frame 28, transitional wall devices, or the like.

The transitional wall 10 may also include a plurality of electrical outlets 24, where each electrical outlet 24 may be electronically connected by wire 21 to a circuit breaker 36. One or more transitional wall devices, pre-RO treatment equipment devices, RO system devices, or the like may receive electric power in accordance with device electric power requirements from the one or more electrical outlets 24.

Positioned on the mobile frame 14 may be a plurality of transitional wall devices configured to establish fluid communication between at least one water source, pre-RO treatment equipment and an RO system, as well as to establish pressure and temperature control of the water being transported therethrough. The wheels 22 of the mobile frame 14 may permit as few as one user to position or reposition the transitional wall 10 to any number of locations across the floor 16 to permit inspection and maintenance of one or more transitional wall devices, pre-RO treatment equipment, RO systems, dialysate distribution systems, and/or other related devices, equipment, systems, and the like that may be in close proximity to the transitional wall 10. The wheels 22 of the mobile frame 14 may further permit as few as one user to transport the transitional wall 10 to and from any place for its intended use, including but not limited to an equipment room 12 at a dialysis center. For example, by way of illustration and not limitation, at least one user may move the transitional wall 10 from a shipping container at a loading dock to an equipment room 12 where pre-RO treatment equipment is located.

The transitional wall devices of the transitional wall 10 may include a cold-water input pipe 44 and a hot-water input pipe 45, where the input pipes 44, 45 may collectively establish fluid communication between the transitional wall 10 and at least one non-purified water source output, including by way of example and not limitation, a municipal water source. Specifically, the cold-water input pipe 44 may provide cold potable water to the transitional wall 10, where the cold potable water may have a temperature above 32° F. and below 100° F. The hot-water input pipe 45 may provide hot potable water to the transitional wall 10, where the hot potable water may have a temperature equal to or greater than 100° F. and below 212° F. In other embodiments, the source of water may be one or more water storage tanks having potable water therein, one or more bores having potable water therein, one or more wells having potable water therein, or the like. It will be apparent to one of ordinary skill in the art that there may be any number of ways to supply water to exemplary transitional walls.

The transitional wall devices of the transitional wall 10 may further include a tempering device 41 for combining hot potable water from hot-water input pipe 45 with cold potable water from cold-water input pipe 44 to achieve a desired downstream water temperature. In certain preferred embodiments, the desired downstream water temperature for proper water treatment equipment operation is 60° F.-85° F. The transitional wall devices of the transitional wall 10 may additionally include at least one thermometer or temperature monitor 33 for monitoring water temperature downstream of the tempering device 41. Where water temperature at one or more locations downstream of the tempering device 41 falls outside a desired temperature range, the tempering device 41 and/or a user controlling the tempering device 41 may adjust the proportion of hot potable water to be mixed with cold potable water to cause the downstream water temperature to reach the desired temperature range.

The transitional wall devices of the transitional wall 10 may also include pre-treatment pipes 40 for transporting water from a water source input (e.g., 44, 45) towards transition pipes 30. A booster pump 38 may be positioned between pre-treatment pipes 40. A tempering device 41 may be positioned upstream of pre-treatment pipes 40. The pre-treatment pipes 40 may include one or more valves 43 permitting user control of water flow rate therein. The booster pump 38 may be controlled by a motor 39, and the booster pump 38 may be configured to cause water to be circulated through various transitional wall devices, pre-RO treatment equipment, RO system devices, or the like. In other embodiments, a pump may be positioned upstream of the tempering device 41. In yet other embodiments, a pump may be positioned downstream of the pre-treatment pipes 40. It will be apparent to one of ordinary skill in the art that there may be any number of different locations along the transitional wall 10 to place one or more pumps without departing from the scope of the present invention. It will further be apparent to one of ordinary skill in the art that any number of different types of pumps may be employed without departing from the scope of the present invention. By way of example and not limitation, an exemplary pump may include any number of different non-variable frequency drive pumps ("non-VFD pumps"), wherein a non-VFD pump may operate according to a pressure switch, which may be adapted to cause the pump to abruptly turn from on to off, or from off to on. An exemplary pump may alternatively and/or additionally include any number of different variable frequency drive pumps ("VFD pumps"), wherein a VFD pump may operate according to digitally controlled pressure transducers, which may be adapted to cause the pump to more gradually and steadily turn from on to off, or from off to on.

Also, the transitional wall devices of the transitional wall 10 may include one or more water pressure sensors/gages 42 for providing water pressure measurements of water downstream of the water source input (e.g., 44, 45). One or more pressure tanks 26 may be configured to cause water pressure to be altered within transitional wall devices, pre-RO treatment equipment, or the like when water pressure falls outside a desired water pressure range. Each of the one or more pressure tanks 26 may be positioned between the inner lower frame 20A and one or more beams of the interior frame 28. Compressed fluid from at least one pressure tank 26 may flow from the pressure tank 26 through pressure pipes 29 to a series pressure input 31, the series pressure input 31 transferring pressure from the compressed fluid to water flowing through pre-treatment pipes 40. The pressure pipes 29 may include a relief valve 27 for permitting a user to equalize pressure in pressure pipes 29 with atmospheric pressure to prevent unwanted pressure buildup within the pressure pipes 29.

The transition pipes 30 may be configured to circulate water to and from pre-RO treatment tanks located downstream of pre-treatment pipes 40 and upstream of a pre-RO treated water output (not shown). Certain transition pipes 30 may include at least one valve 25 for controlling water flow rate therein. In the embodiment shown, the input pipes 44, 45 and pressure pipes 29 comprise copper, and the series pressure input 31, pre-treatment pipes 40, and transition pipes 30 comprise polyvinyl chloride ("PVC"). In other embodiments, any of the aforementioned pipes may comprise PVC, galvanized steel, cross-linked polyethylene ("PEX"), some combination thereof, or the like. It will be apparent to one of ordinary skill in the art that there may be any number of different materials and/or methods used to construct, mold, manufacture, or the like exemplary transitional wall 10 pipes.

Furthermore, the transitional wall 10 may include a sampling station 32 for providing samples of water from relevant stages of water treatment. Stringent regulatory standards or guidelines may require or suggest certain maximum contaminant levels for various stages of water treatment. Testing at various stages of water treatment may also be necessary to ensure that all pre-RO treatment equipment and transitional wall devices are operating properly. One or more users may readily obtain water samples from any desired stage of treatment from the sampling station 32, and thereafter certain contaminant levels in the samples may be measured by, for example by way of illustration and not limitation, infectivity assays, sensor probes, ionic chromatographs, chemical test strips, or the like. The sampling station 32 may include a plurality of water pressure gages 34, the water pressure gages 34 providing measured water pressure in one or more transition pipes 30. In preferred embodiments, the sampling station 32 is horizontally oriented 32A, and a drainage basin 35 is configured to collect water discharged from the sampling station 32. In other embodiments, the sampling station may be vertically oriented 32B.

Figure 2:
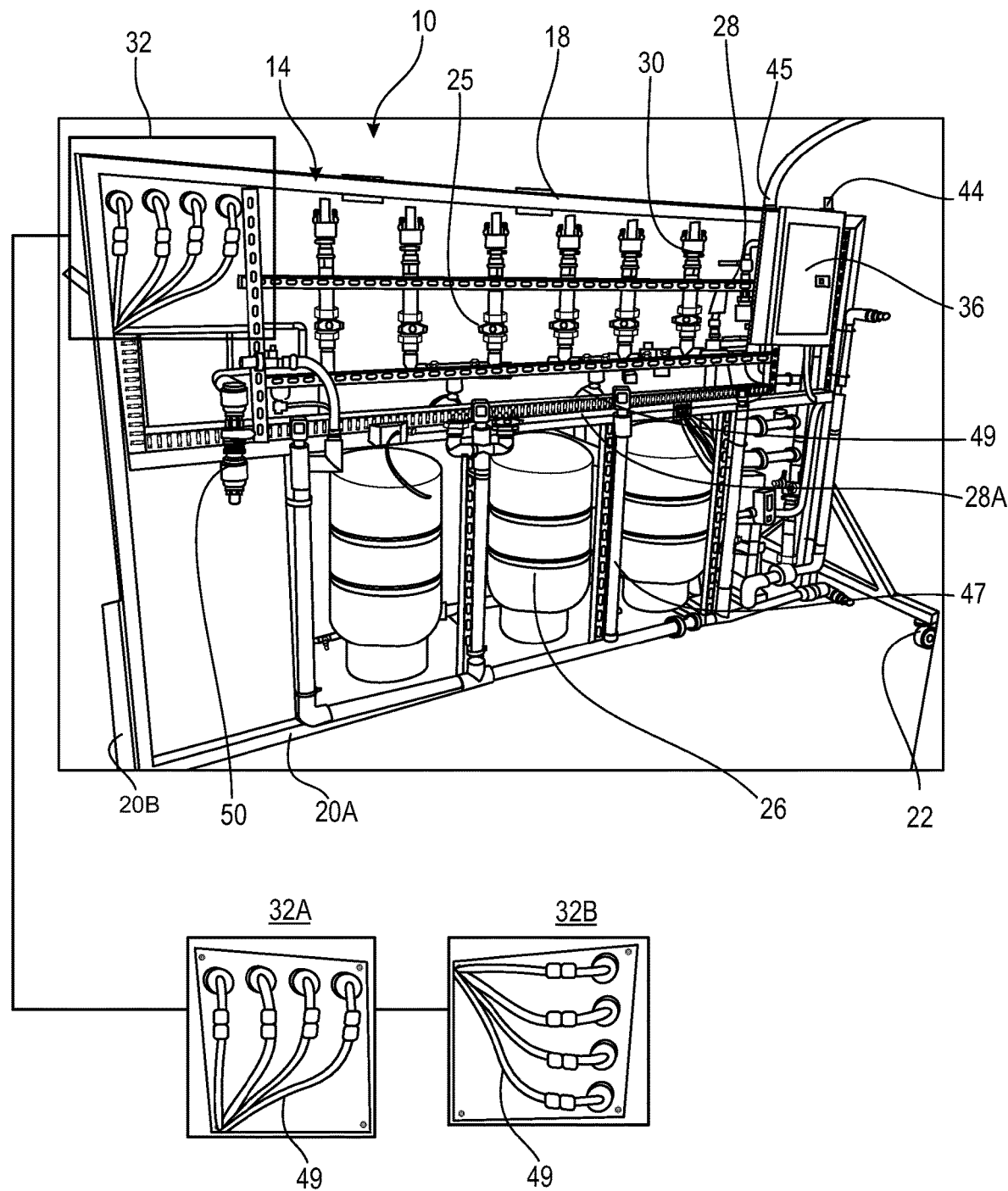
FIG. 2 is a rear perspective view of the exemplary transitional water treatment wall of the FIG. 1 embodiment.

In FIG. 2, the back of the exemplary transitional wall 10 having a mobile frame 14, the mobile frame 14 including an upper frame 18, interior frame 28, inner lower frame 20A and outer lower frame 20B with wheels 22, of the FIG. 1 embodiment is shown. The circuit breaker 36 may be affixed to the upper frame 18 and interior frame 28, and may be positioned to the rear of the hot-water input 45 and cold-water input 44. The transition pipes 30 having valves 25 may be secured to the interior frame 28, and sampling tubes 49 may establish fluid communication between transition pipes 30 and the sampling station 32, which may be horizontally 32A or vertically 32B oriented. A drainage system 47 may be attached to one or more beams of the interior frame 28, including but not limited to the central horizontal beam 28A, and/or the inner lower frame 20A. Various pipes of the drainage system 47 may be positioned adjacent to one or more pressure tanks 26. A pre-RO treated water output 50 may be positioned downstream of transition pipes 30 and may be in fluid communication therewith.

Figure 3:
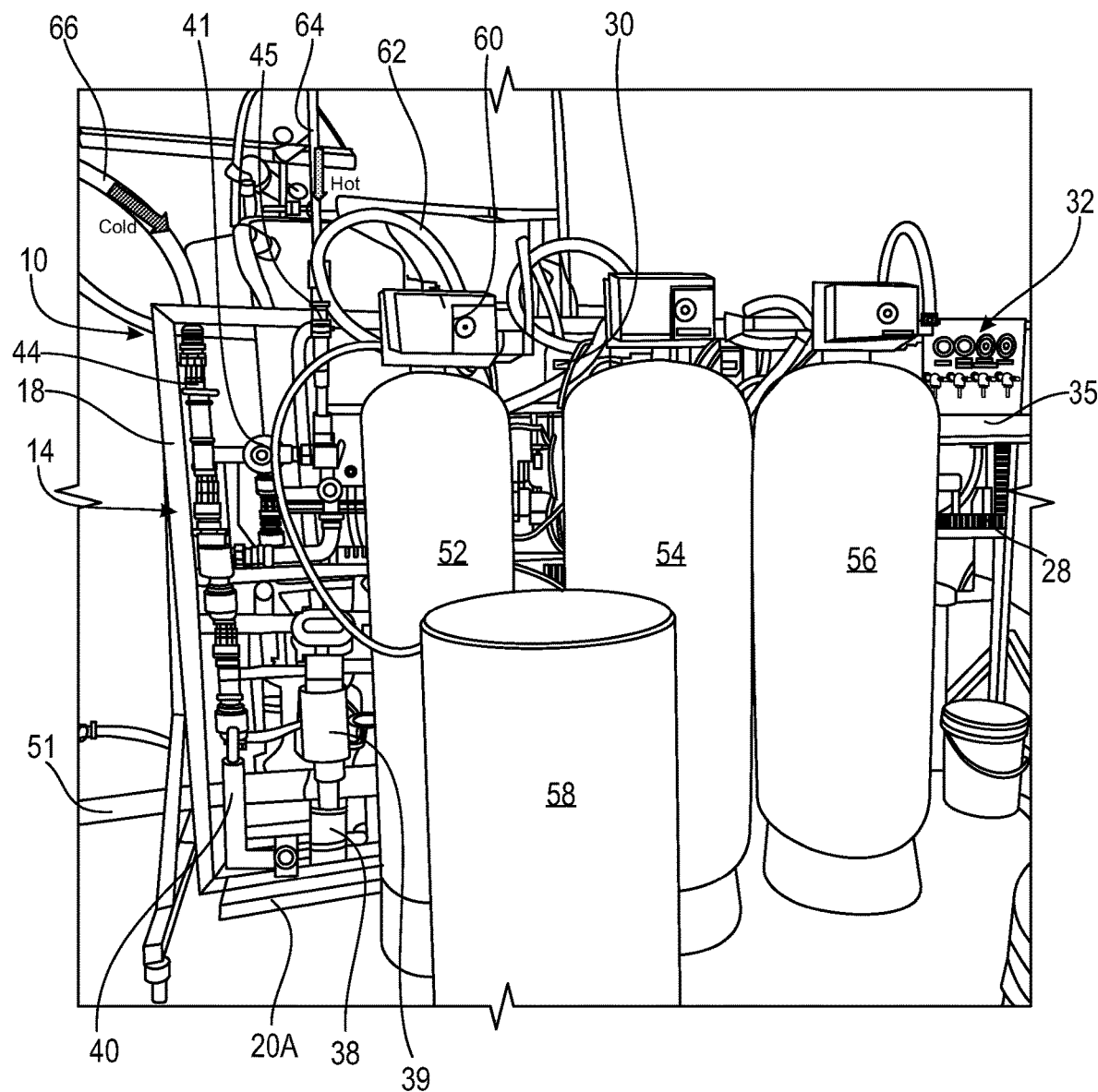
FIG. 3 is a front perspective view of the exemplary transitional water treatment wall of the FIG. 1 embodiment, where the transitional water treatment wall connects in series a plurality of water treatment tanks.

Referring now to FIG. 3, the transitional wall 10 of the FIG. 1 embodiment is shown establishing fluid communication between a hot-water source 64 (flow demonstrated by arrow labeled "Hot"), a cold-water source 66 (flow demonstrated by arrow labeled "Cold") and pre-RO treatment equipment (e.g., 52, 54, 56, 58, 60), as well as establishing pressure and temperature control of water flowing through the transitional wall devices and pre-RO treatment equipment. The pre-RO treatment equipment may remove contaminants from the water independent of the transitional wall 10. The hot water source 64 may discharge heated water into a hot-water input pipe 45 affixed to the upper frame 18 of the mobile frame 14. The cold-water source 66 may discharge cold water into a cold-water input pipe 44 affixed to the upper frame 18 of the mobile frame 14. A tempering device 41 may mix hot water with cold water to achieve a desired water temperature, and thereafter the water may flow through pre-treatment pipes 40 to a booster pump 38 controlled by a motor 39. The pre-treatment pipes 40 and booster pump 38 may be affixed to the inner lower frame 20A and/or one or more beams of the interior frame 28 of the mobile frame 14. Further shown is the mixing station 32 having a drainage basin 35 of the FIG. 1 embodiment.

The pre-RO treatment equipment may include a water softener tank ("water softener") 52 in fluid communication with a brine tank 58. The water softener 52 may be configured to remove hardness forming ions, including but not limited to calcium and magnesium ions, and chemical compounds including compounds having one or more metals such as sodium, calcium and magnesium, from the water. The brine tank 58 may be configured to replenish the water softener 52 with certain salts necessary for the water softener 52 to operate properly, where the salts may be delivered in the form of a brine solution. A lockout system (not shown) in the water softener 52 may prevent brine from the brine tank 58 from mixing with the water in the water softener 52. The water softener 52 may protect certain downstream equipment from the precipitation of inorganic material. For example, by way of illustration and not limitation, the water softener 52 may protect one or more reverse osmosis membranes from limescale buildup and related fouling.

The pre-RO treatment equipment may further include a primary carbon tank 54. The pre-RO treatment equipment may also include a secondary carbon tank 56. The primary carbon tank 54 may be configured to remove organic contaminants and chemicals including chlorine molecules such as but not limited to hypochlorous acid, hydrochloric acid, and chloramines from the water. The secondary carbon tank 56 may be configured to remove chemicals including chlorine molecules from the water where said chemicals were not entirely removed by the primary carbon tank 54. The primary 54 and secondary 56 carbon tanks may protect downstream membranes from damage caused by chlorine molecules or extreme pH levels. In other embodiments, the pre-RO treatment equipment may also include, by way of illustration and not limitation, an iron remover for removing iron from the water, and/or a particle filter for removing particulates or sediment from the water.

Controller heads 60 may be positioned on each of the water softener 52, primary carbon tank 54 and secondary carbon tank 56 (independently or collectively, "pre-RO treatment tanks"), where each controller head 60 controls water flow to and from the at least one pre-RO treatment tank. Connection hoses 62 may establish fluid communication between the at least one pre-RO treatment tank (e.g., 52, 54, 56) and one or more transition pipes 30. The transition pipes 30 may transfer water along the transitional wall 10 by carrying water from one connection hose 62 leading from one controller head 60 to another connection hose 62 leading to another controller head 60. For example, by way of illustration and not limitation, water treated by the water softener 52 may be discharged from a controller head 60 connected to a water softener 52 to a connection hose 62 leading to transition pipes 30, where the transition pipes 30 may cause the water treated by the water softener 52 to be transferred to another connection hose 62 leading to a primary carbon tank 54. Referring back to FIG. 2 in addition to FIG. 3, it will be understood by one of ordinary skill in the art that pre-RO treatment tanks (e.g., 52, 54, 56) may be ordered in any number of different ways within a fluid series between the water source input (e.g., 44, 45) and the pre-RO treated water output 50 without departing from the scope of the present invention.

Figure 4:
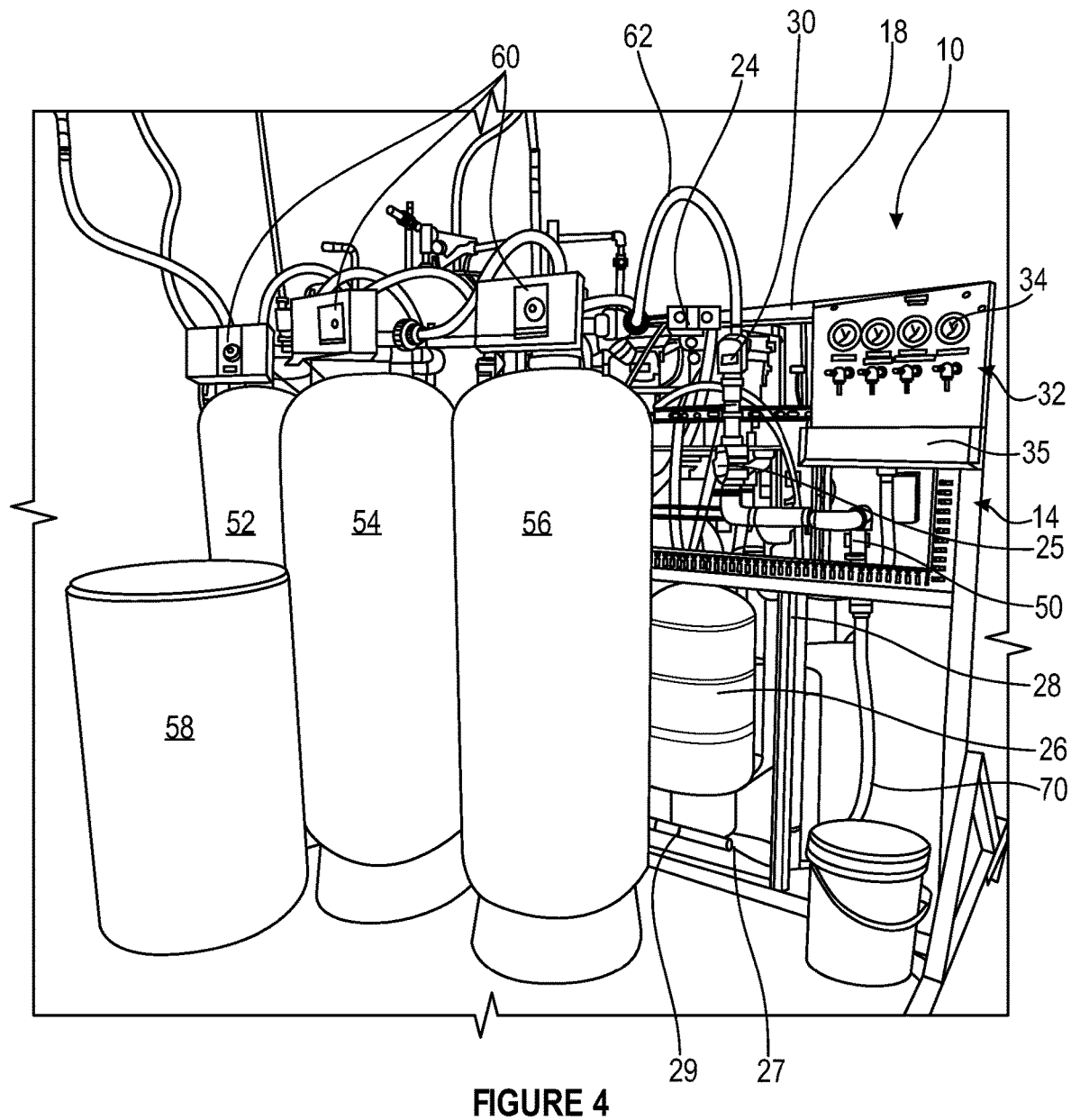
FIG. 4 is another front perspective view of the FIG. 3 embodiment, where a pre-RO treated water output is shown positioned below an exemplary water sampling station.

FIG. 4 shows the exemplary transitional water treatment wall 10 of the FIG. 3 embodiment, where a pre-RO treated water output 50 is shown positioned below an exemplary water sampling station 32 having a drainage basin 35 and a plurality of water pressure gages 34. An exemplary water pressure sensor/gage may comprise a glycerin filled analog needle gauge. An exemplary water pressure sensor/gage may alternatively and/or additionally comprise a pressure transducer linked to a programmable logic controller ("PLC") connected to a human machine interface ("HMI") (collectively referred to herein as a "PLC-HMI pressure transducer sensor"). In certain embodiments, a PLC-HMI pressure transducer sensor operates at 4 to 20 megaamperes (4-20 mA). In certain embodiments, a PLC-HMI pressure transducer sensor operates as a primary pressure sensor for the transitional wall, and a glycerin filled analog needle gauge operates as a backup pressure sensor for the transitional wall (e.g., in the event that a component of the PLC-HMI pressure transducer sensor fails). The pre-RO treated water output 50 may be connected to one or more transition pipes 30, where the flow of water may be controlled by a valve 25. Certain transition pipes 30 may be connected to a connection hose 62 establishing fluid communication between the transition pipes 30 and at least one pre-RO treatment tank (e.g., 52, 54, 56). Each connection hose 62 may be attached to a controller head 60 at a first end of the connection hose 62, and attached to a transition pipe 30 at a second end of the connection hose 62. The controller head 60 may be powered by an electronic connection with an electrical outlet 24 positioned on the mobile wall 14. The transition pipes 30, water sampling station 32, and pre-RO treated water output 50 may each be affixed to the upper frame 18 and/or one or more beams of the interior frame 28 of the mobile frame 14. The pre-RO treated water output 50 may be connected to an RO system input 70.

Additionally, FIG. 4 shows a brine tank 58 positioned in proximity to a water softener tank 52, where the water softener tank 52 is connected in fluid series with a primary carbon tank 52 and a secondary carbon tank 56. Furthermore, positioned below at least one transition pipe 30 may be at least one air pressure tank 26 in fluid communication with at least one pressure pipe 29, the pressure pipe having a relief valve 27.

Figure 5:
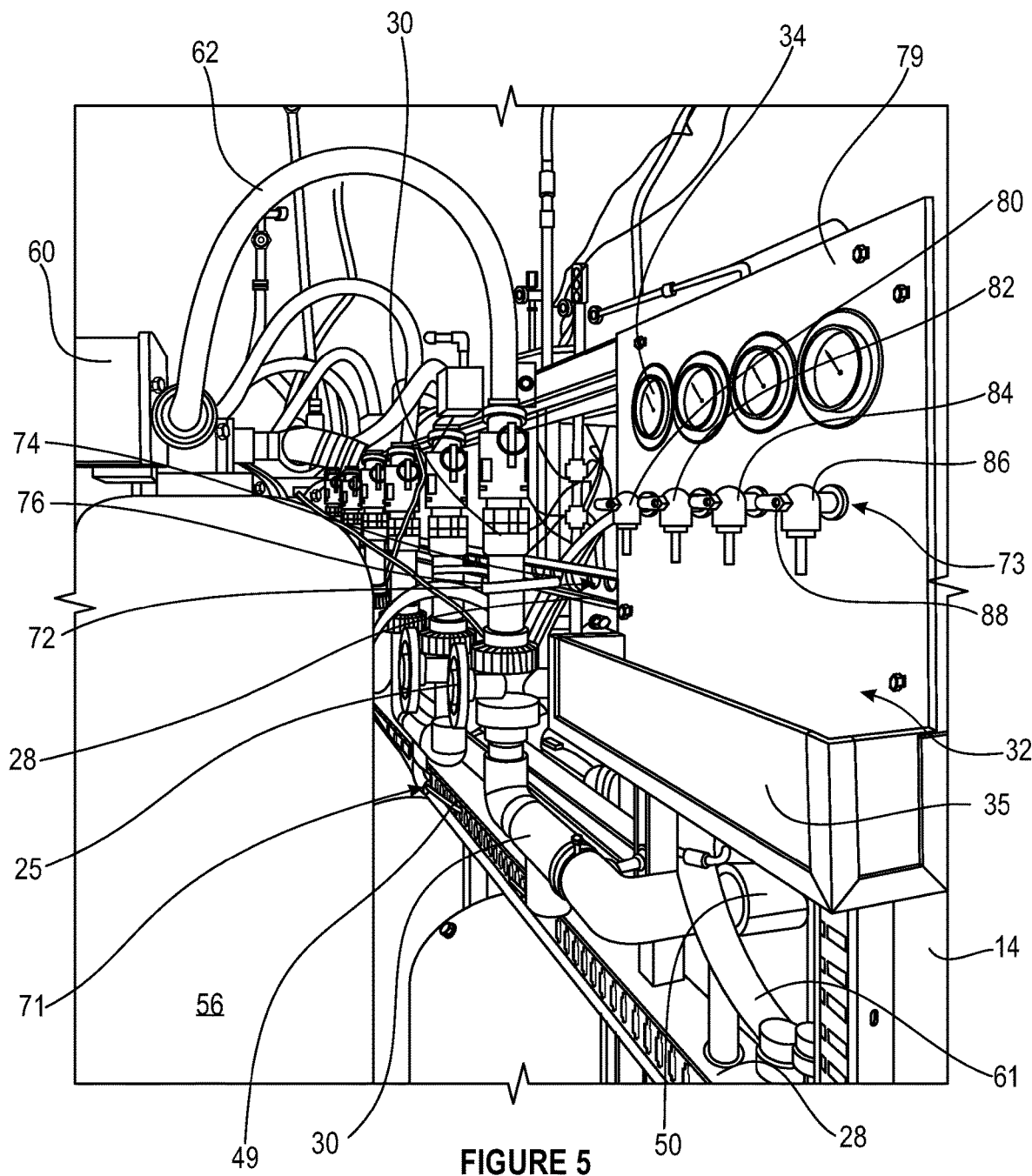
FIG. 5 is a perspective view of the exemplary water sampling station of the FIG. 4 embodiment, the water sampling station having a plurality of faucets, each faucet in fluid communication with transition pipes.

FIG. 5 shows the exemplary water sampling station 32 of the FIG. 4 embodiment positioned on the mobile frame 14. The water sampling station 32 may comprise a station frame 79 having a plurality of apertures 73, each aperture 73 permitting connection between a sampling tube 49 and a sample faucet (e.g., 80, 82, 84, 86). Each sample faucet may include at least one valve 88 for controlling the flow rate of water discharged therethrough. A drainage basin 35 may be configured to collect water discharged from one or more sample faucets and not collected by a user. The drainage basin 35 may cause the water discharged from one or more sample faucets and not collected by a user to be discharged into a sample drainage tube 61.

The water sampling station 32 may specifically include a pre-softener faucet 80, where water from the sampling tube 49 supplying water to the pre-softener faucet 80 may be drawn from at least one location on the transitional wall 10 downstream of a water source input, and upstream of a water softener (not shown). The water sampling station 32 may further include a post-softener faucet 82, where water from the sampling tube 49 supplying water to the post-softener faucet 82 may be drawn from at least one location on the transitional wall 10 downstream of the water softener, and upstream of a primary carbon tank (not shown). The water sampling station 32 may also include a post-primary carbon (or "pre-polisher carbon") faucet 84, where water from the sampling tube 49 supplying water to the pre-polisher carbon faucet 84 may be drawn from at least one location on the transitional wall 10 downstream of the primary carbon tank, and upstream of a secondary carbon tank 56. The water sampling station 32 may additionally include a post-secondary carbon (or "RO feed water") faucet 86, where water from the sampling tube 49 supplying water to the RO feed water faucet 86 may be drawn from at least one location on the transitional wall 10 downstream of the secondary carbon tank 56 and upstream of a pre-RO treated water output 50. It will be apparent to one of ordinary skill in the art that an exemplary water sampling station may be adapted to provide water samples from any number of different locations across a transitional wall, pre-RO treatment equipment, locations upstream of the transitional wall, locations downstream of the transitional wall, some combination thereof, or the like, without departing from the scope of the present invention.

Each sampling tube 49 may have a first end of the sampling tube 49 attached to a transition pipe aperture 71 positioned at the bottom of a transition pipe 30, and a second end of the sampling tube 49 attached to a sample faucet (e.g., 80, 82, 84, 86) to establish fluid communication between the transition pipe 30 and the sample faucet. A water pressure gage 34 may provide the measured water pressure in the transition pipe 30 where water for the sample faucet is drawn from. In the particular embodiment shown, the sampling tubes 49 are woven through apertures of and partially positioned within beams of the interior frame 28 to provide structural support to the sampling tubes 49. It will be apparent to one of ordinary skill in the art that there may be any number of different ways to draw water from certain transitional wall devices into sampling tubes 49. It will further be apparent to one of ordinary skill in the art that there may be any number of different ways to provide structural support to the sampling tubes 49.

In the exemplary embodiment shown, transition pipes 30 are positioned between a connection hose 62 extending from a controller head 60 of the secondary carbon tank 56, and the pre-RO treated water output 50. The transition pipes 30 may be affixed to at least one beam of the interior frame 28 by fastened rigid straps 76, where each rigid strap 76 may be secured to the at least one beam of the interior frame 28 by one or more bolts 74 engaged in beam apertures 72. It will be apparent to one of ordinary skill in the art that there may be any number of different ways to secure transition pipes and other transitional wall devices to an exemplary mobile transitional wall frame without departing from the scope of the present invention. The flow rate of water in one or more transition pipes 30 may be controlled by a valve 25.

Figure 6:
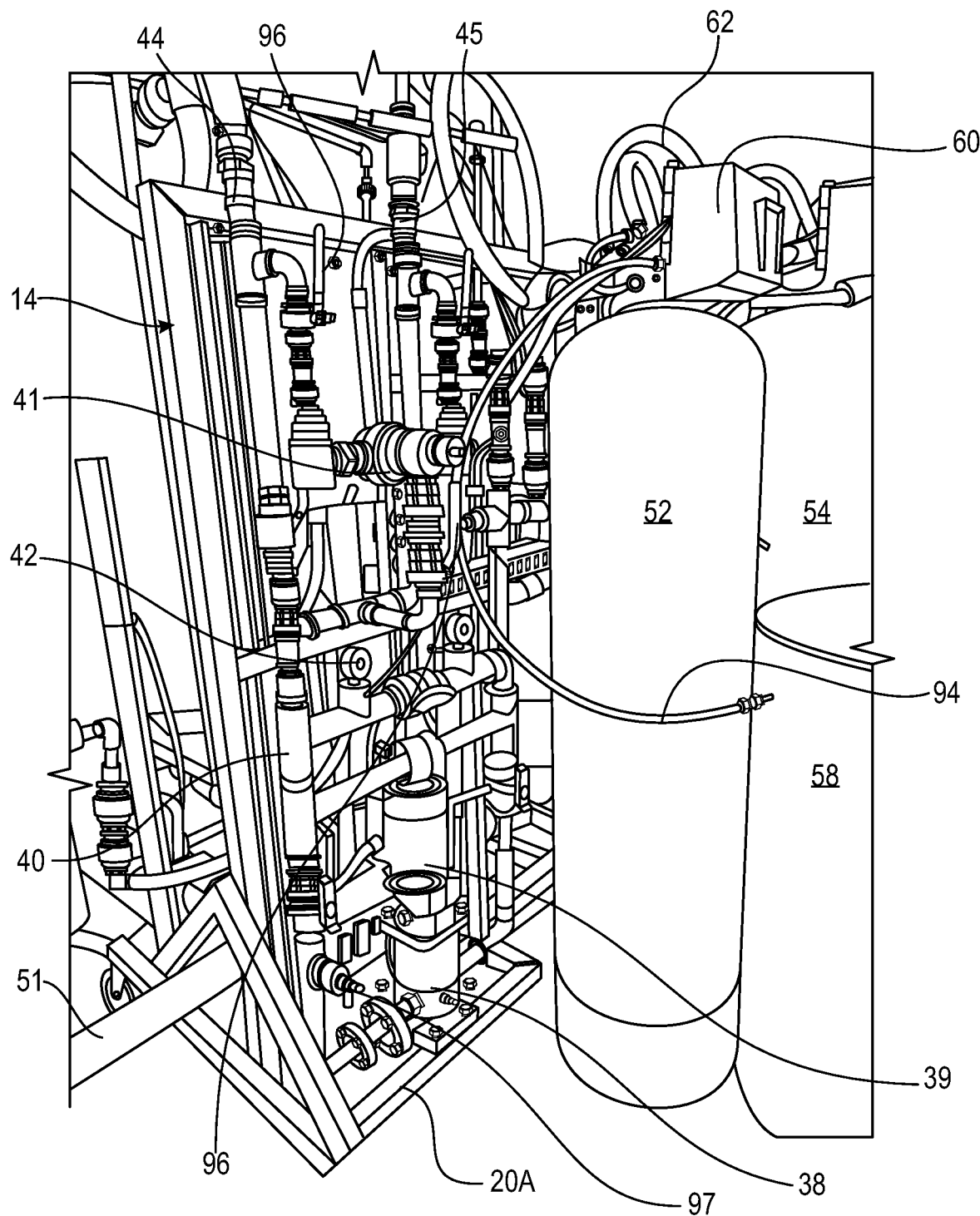
FIG. 6 is another perspective view of the FIG. 3 embodiment, where a water booster pump is configured to circulate water through a pre-RO treatment circuit.

FIG. 6 shows exemplary transitional wall devices (e.g., 40, 41, 44, 45) positioned on an exemplary mobile wall 14 of the FIG. 3 embodiment. Ball valves 96 may permit user control of the flow rate of water traveling to and from the tempering device 41. The tempering device 41 may include an adjustment knob (not shown) permitting a user to set a desired temperature for water to be circulated through transitional wall devices and pre-RO treatment equipment. The tempering device 41 may further include temperature sensitive springs (not shown) configured to alter the proportion of hot water from hot water pipe 45 to be mixed with cold water from cold water pipe 44 to achieve a desired water temperature.

FIG. 6 additionally shows the water booster pump 38 powered by motor 39 of the FIG. 3 embodiment, where the water booster pump 38 is configured to circulate water through transitional wall devices and pre-RO treatment equipment (e.g., 52, 54, 60, 62). Furthermore, a brine tank 58 is shown in proximity to a water softener 52. A brine hose 94 may establish fluid communication between the water softener 52 and the brine tank 58, where the brine hose 94 may be connected to the brine tank 58 on a first end, and may be connected to the water softener tank 52 on a second end. Also shown is a water pressure relief valve 97 positioned at pre-treatment pipe 40 in close proximity to inner lower frame 20A. The water pressure relief valve 97 may be configured to discharge water to decrease water pressure across the transitional wall 10 when measured water pressure shown by pressure gage(s) 42 exceeds a desired pressure range. In other embodiments, the water pressure relief valve 97 may be configured to discharge water through an air gap into the drainage pipe 51.

Figure 7:
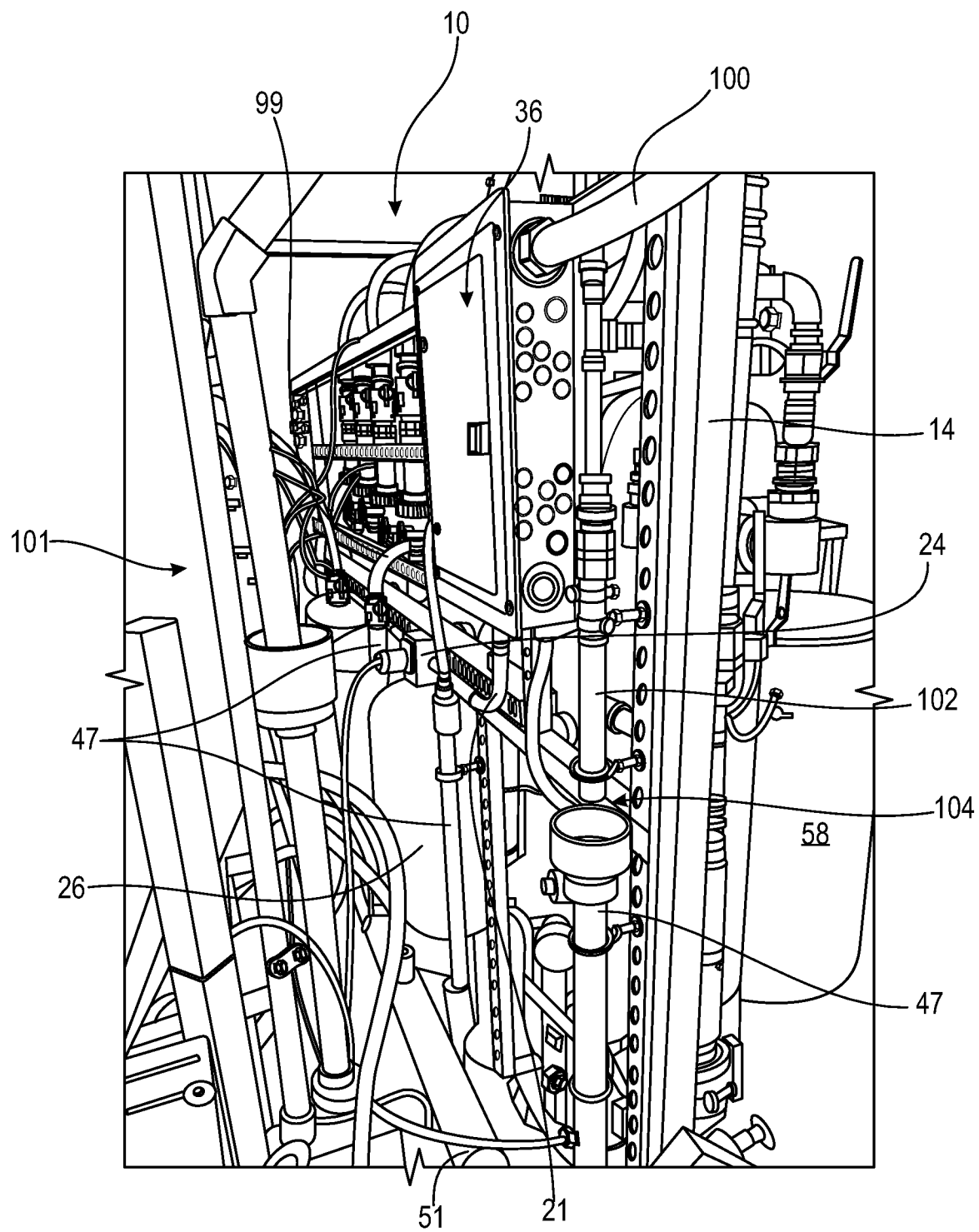
FIG. 7 is a perspective view of an exemplary transitional water treatment wall for dialysis, and an exemplary dialysate supply system.
Figure 8:
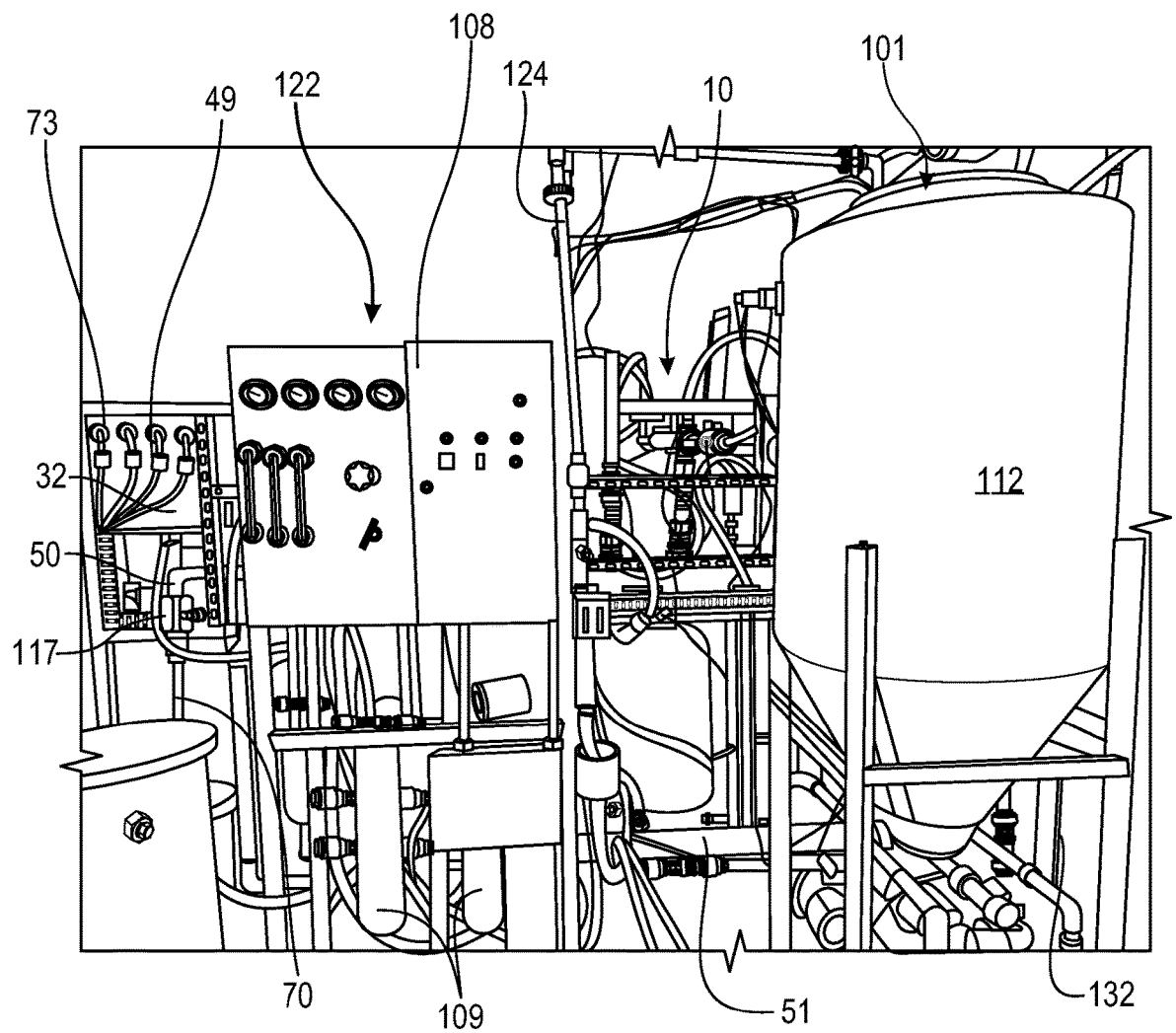
FIG. 8 is another perspective view of the FIG. 7 embodiment, where an RO system is shown in proximity to the exemplary transitional water treatment wall.

Referring now to FIGS. 7 and 8, an exemplary transitional water treatment wall for dialysis 10 is shown connected in series with an exemplary dialysis RO system 122 and dialysate supply system 101. One or more transitional wall 10 devices, pre-RO treatment equipment (e.g., 58) and/or RO system 122 devices may be configured to discharge (e.g., demonstrated by hose 99, where hose 99 may be linked to at least one pre-RO treatment tank) excess or rejected fluid into an exemplary drainage system 47 connected to drainage pipe 51. Referring specifically to FIG. 7, the drainage system 47 may be affixed to the frame 14 of the transitional wall 10 in close proximity to the pressure tanks 26. Air gaps 104 may isolate certain pipes (e.g., 102), hoses (e.g., 99), tubes, or the like from the drainage system 47, where said pipes, hoses, tubes or the like may be in fluid communication with and may discharge excess or rejected fluid from certain transitional wall 10 devices, pre-RO treatment equipment (e.g., 58) and/or RO system devices. The air gaps 104 may be configured to prevent possible contaminants within the drainage system 47 from entering said pipes (e.g., 102), hoses (e.g., 99), tubes or the like. The drainage system 47 may be configured to cause fluid discharged from certain pipes, hoses, tubes, or the like to flow into at least one drainage pipe 51.

Also shown in FIG. 7 is an exemplary circuit breaker 36 in electronic communication (demonstrated by power input 100) with a power supply (not shown). One or more wires 21 may lead from the circuit breaker 36 to one or more electrical outlets 24, causing electric power to be available from the one or more electrical outlets 24.

Referring to FIG. 8, the transitional wall 10 devices and pre-RO treatment equipment may be in fluid communication with the RO system 122, where said fluid communication may be established by at least one pre-RO treated water output 50 connected to at least one RO system input 70. The RO system 122 may comprise one or more reverse osmosis filters 109 for removing remaining ionic and microbiological contaminants, including but not limited to bacteria, endotoxins, viruses, salts, particles, and dissolved organic substrates from the water. The RO system 122 may further comprise an RO system monitoring frame 108 permitting one or more users to monitor and/or control various aspects of the RO system 122. One or more pipes 124 may establish fluid communication between the RO system 122 and the dialysate supply system 101. The dialysate supply system 101 may comprise a storage tank 112 for storing purified water or dialysate. The dialysate supply system 101 may further comprise an additional filter 132, where the additional filter 132 may include an endotoxin filter.

Figure 9:
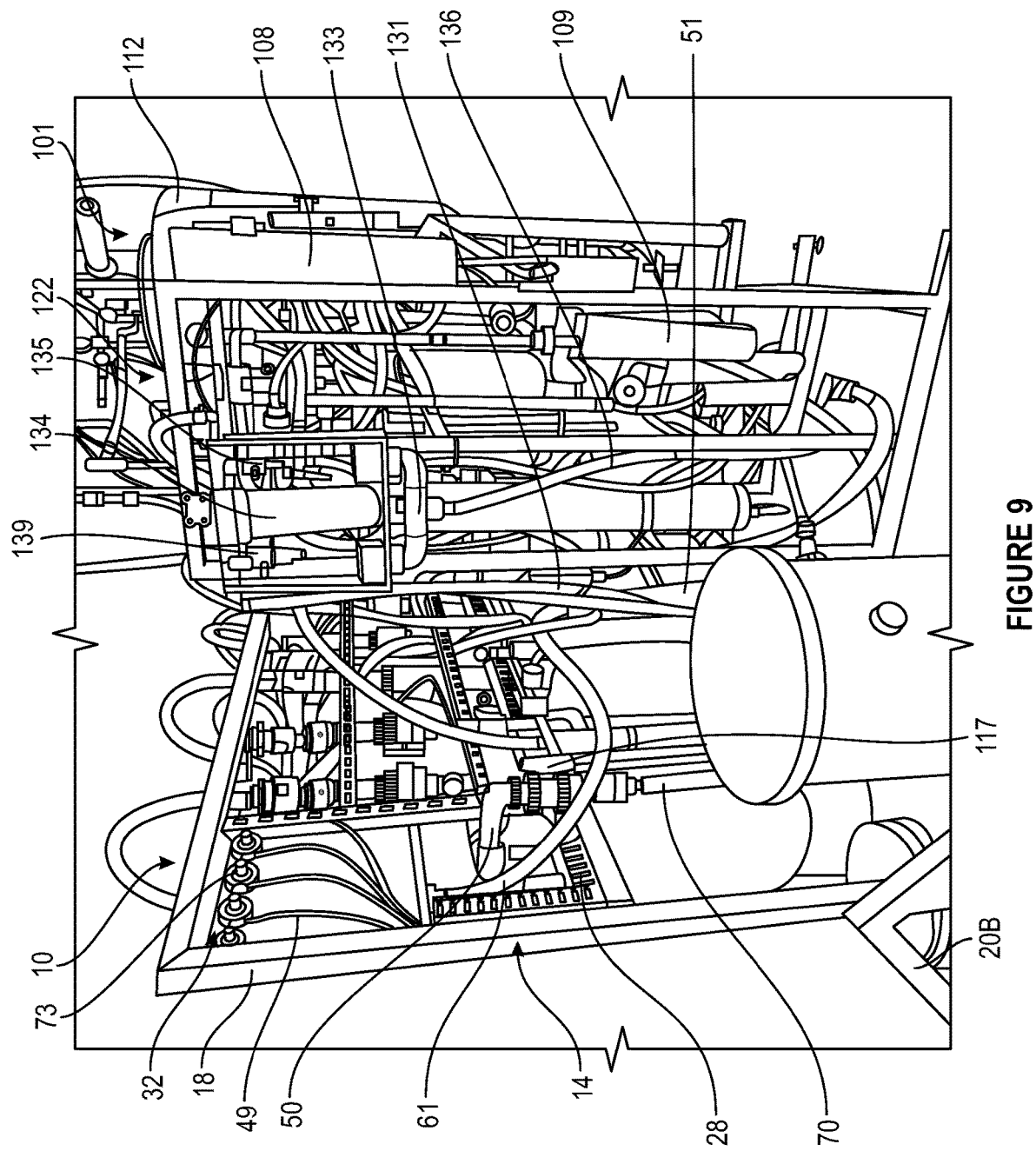
FIG. 9 is a left side perspective view of the FIG. 8 embodiment.
Figure 10:
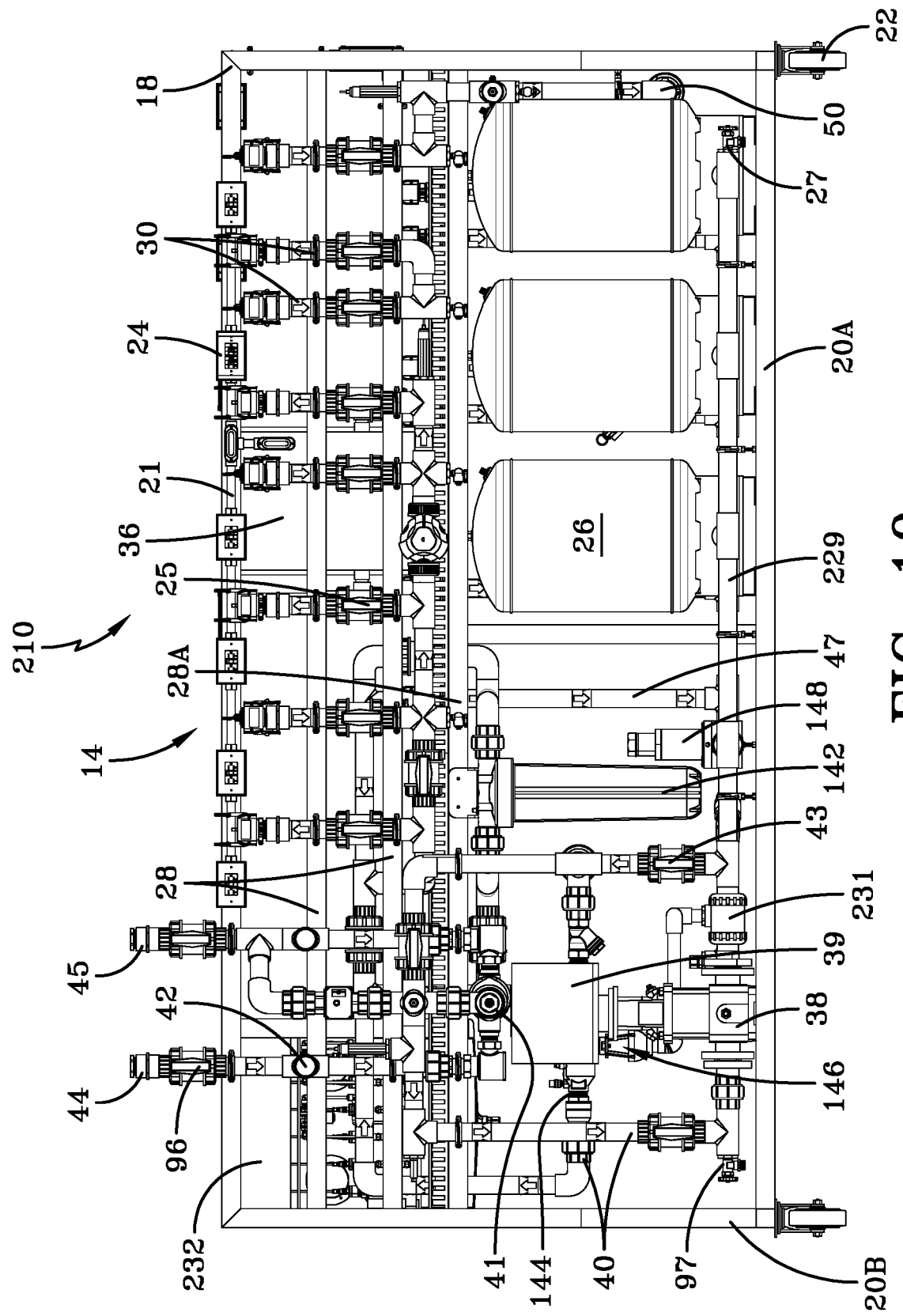
FIG. 10 is a front plan view of another exemplary transitional water treatment wall for dialysis.
Figure 11:
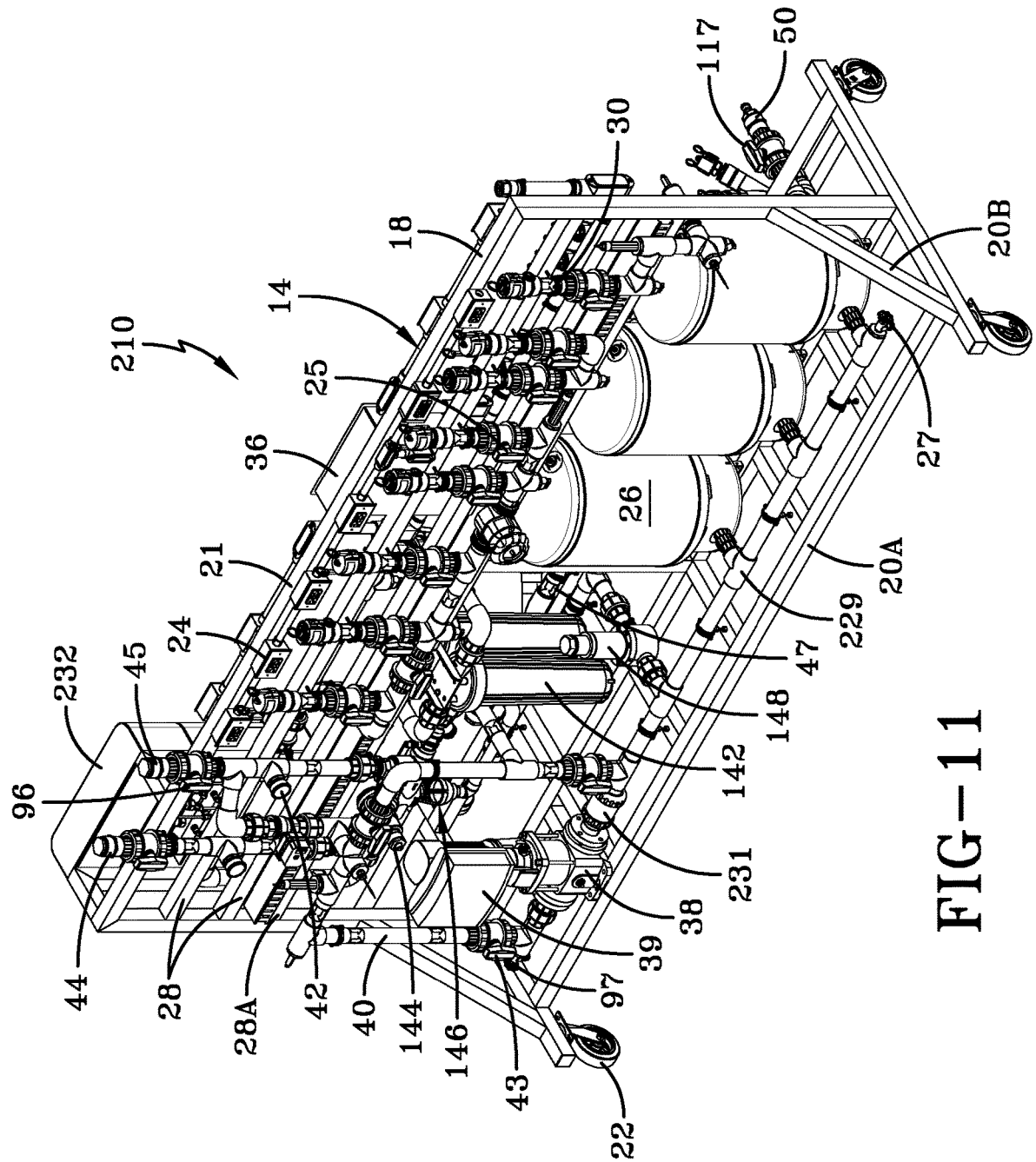
FIG. 11 is a front perspective view thereof.
Figure 12:
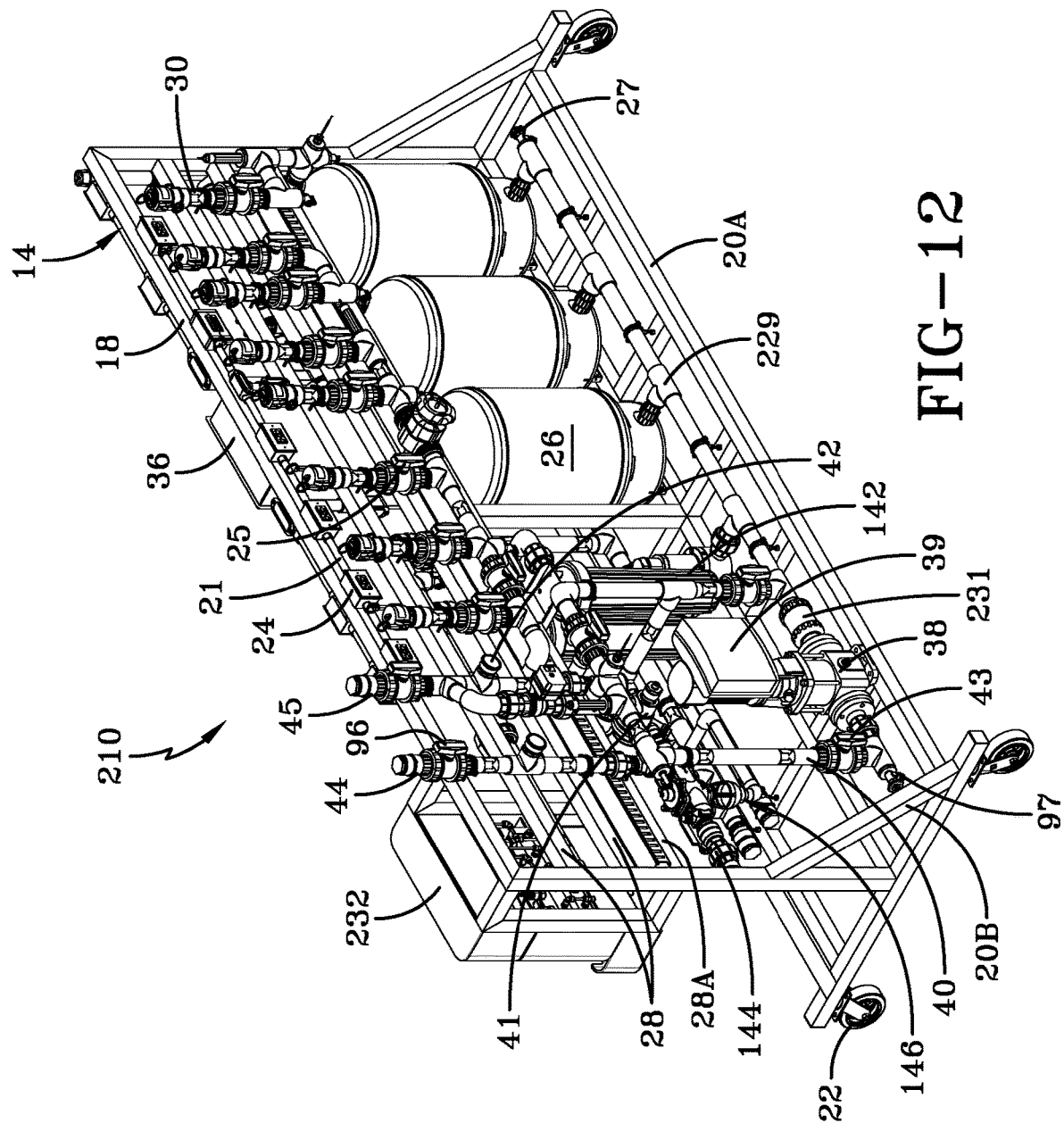
FIG. 12 is another front perspective view thereof.
Figure 13:
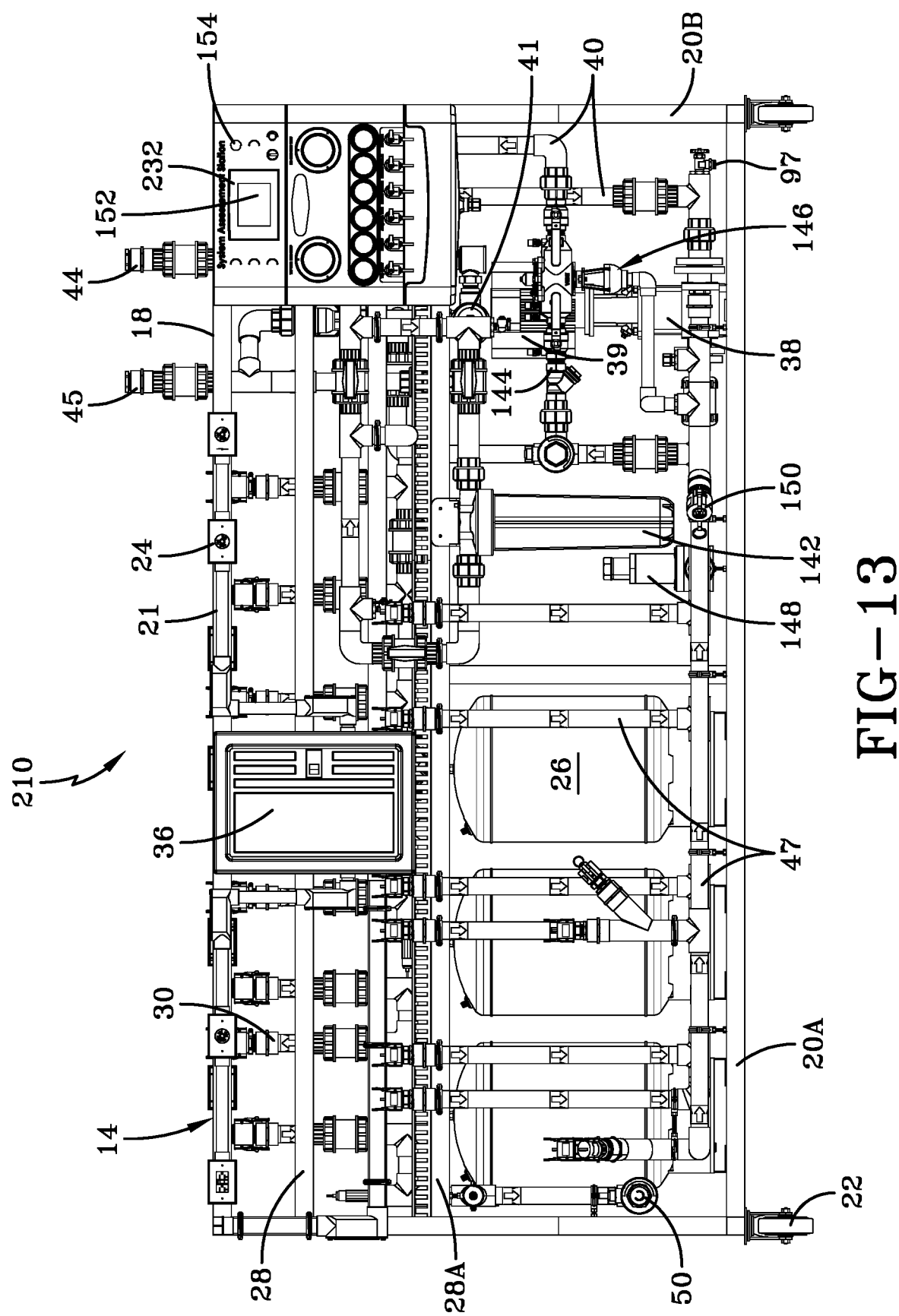
FIG. 13 is a rear plan view thereof.
Figure 14:
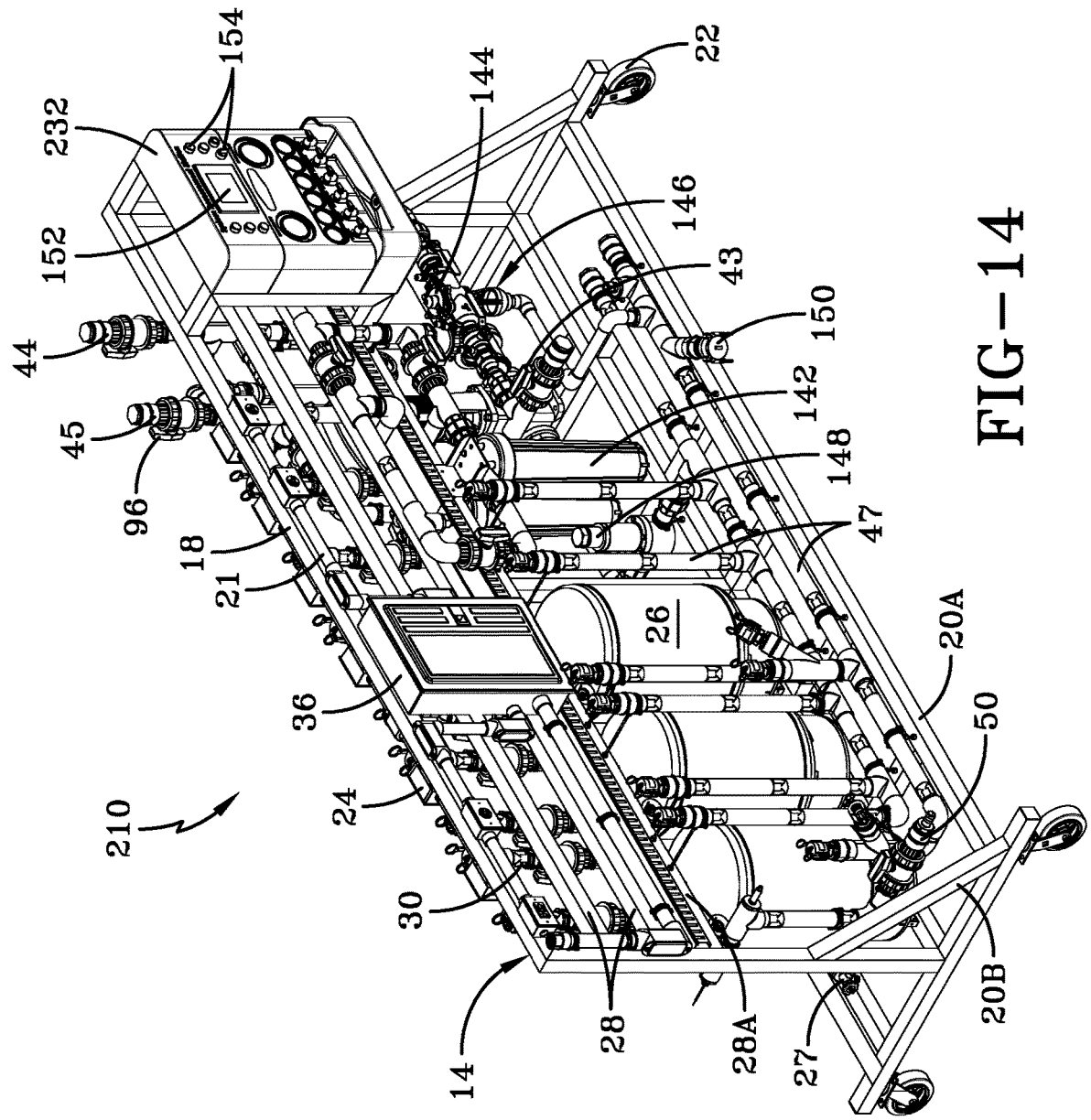
FIG. 14 is a rear perspective view thereof.
Figure 15:
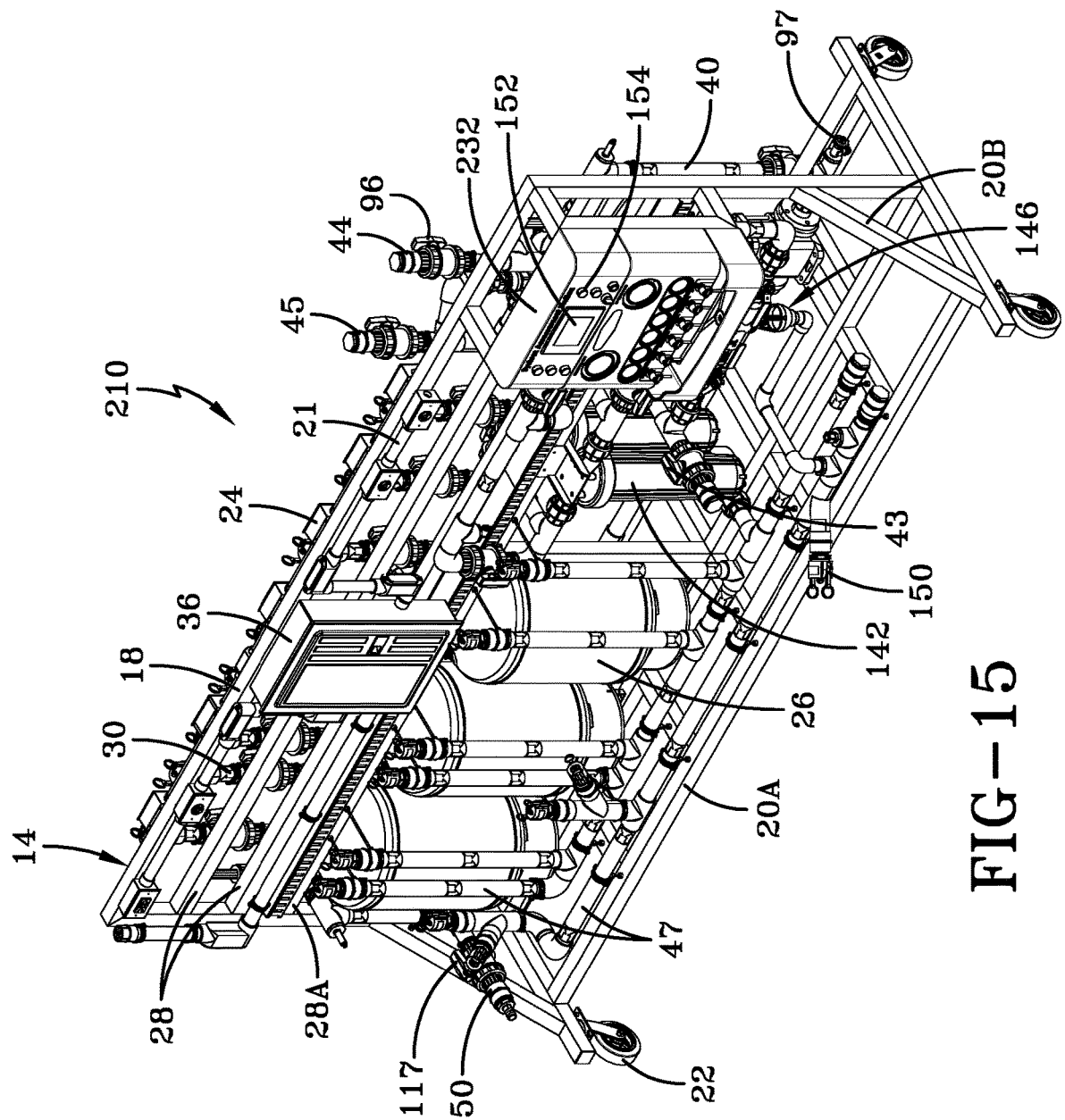
FIG. 15 is another rear perspective view thereof.
Figure 16:
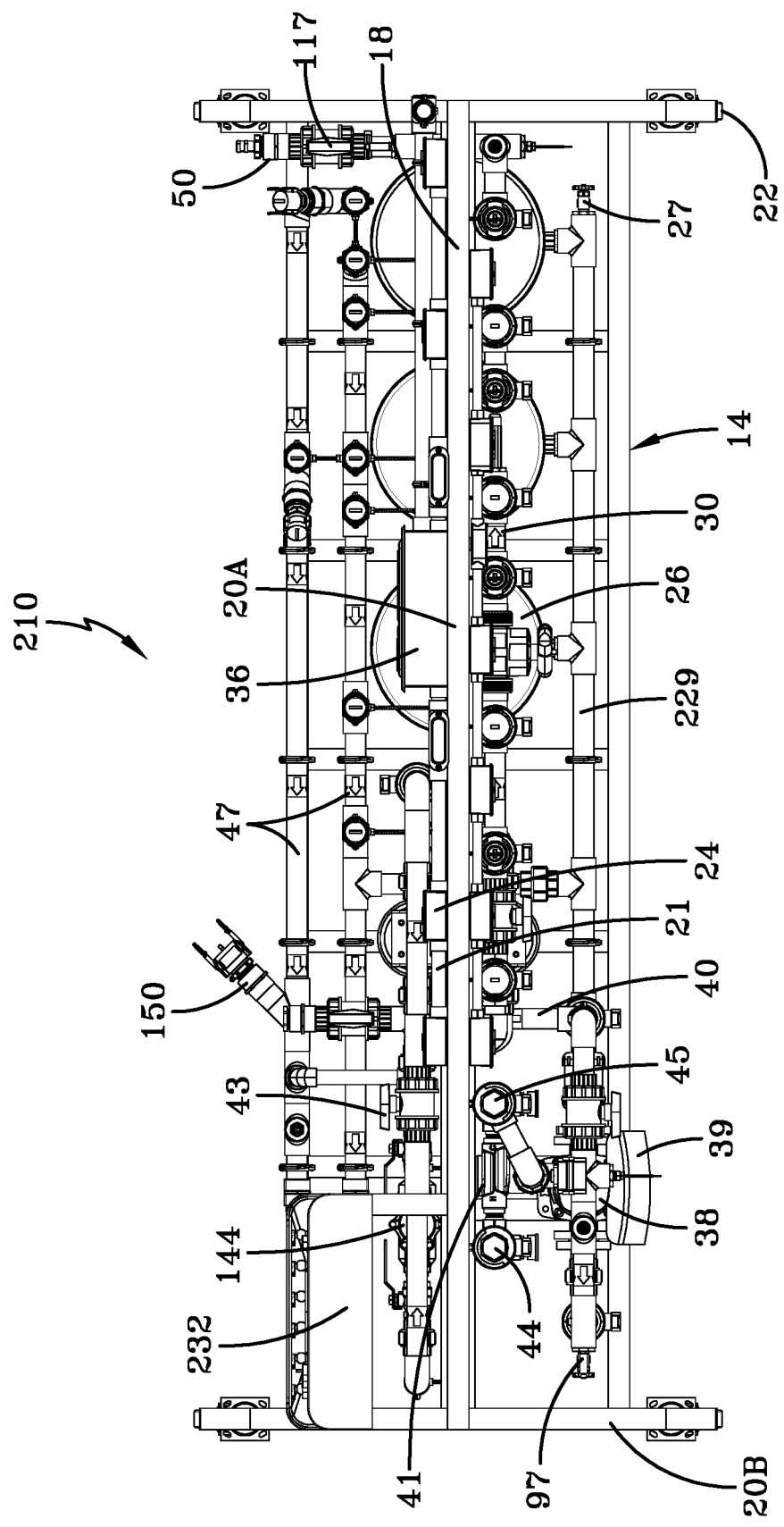
FIG. 16 is a top plan view thereof.
Figure 17:
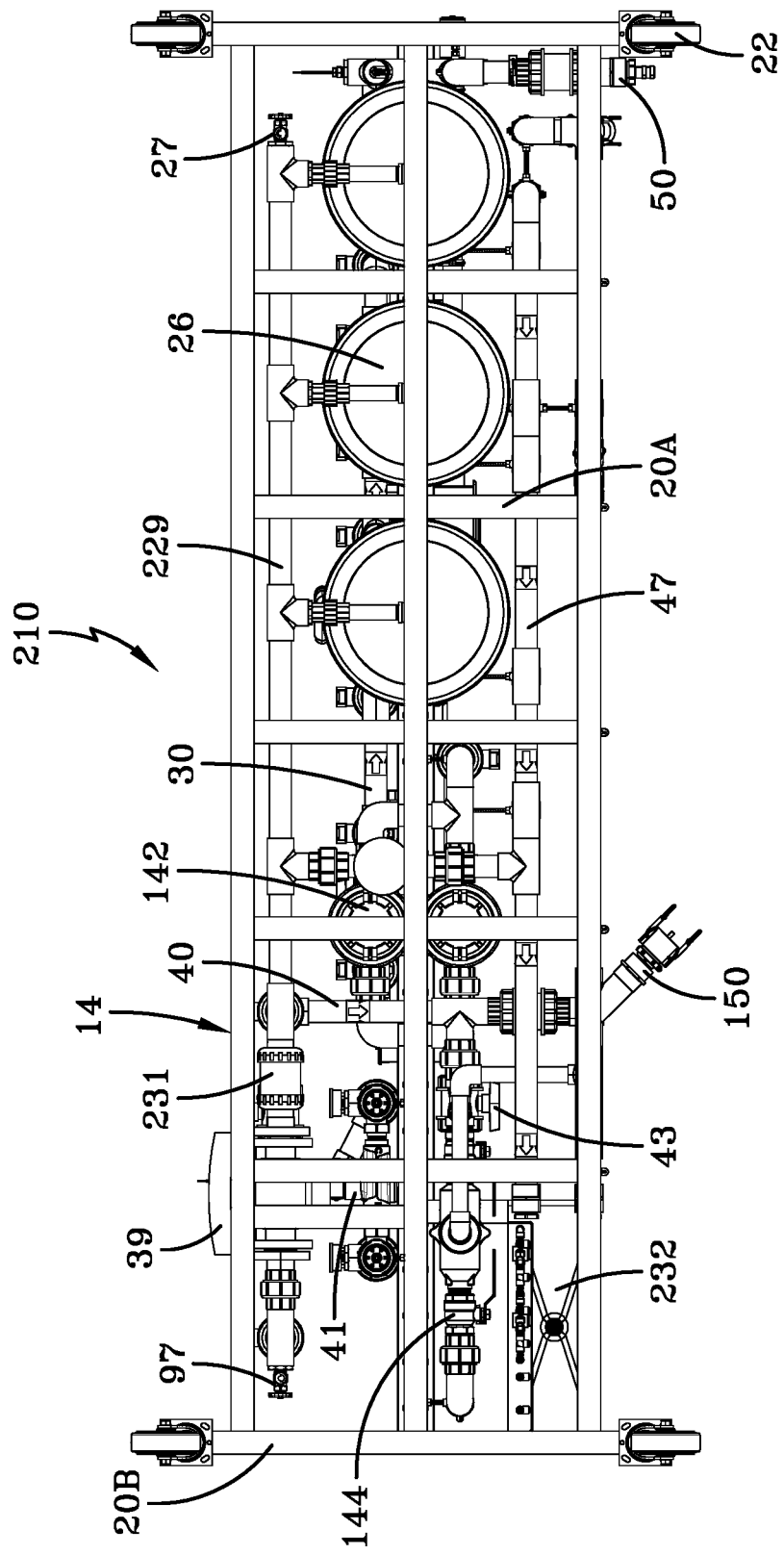
FIG. 17 is a bottom plan view thereof.
Figure 18:
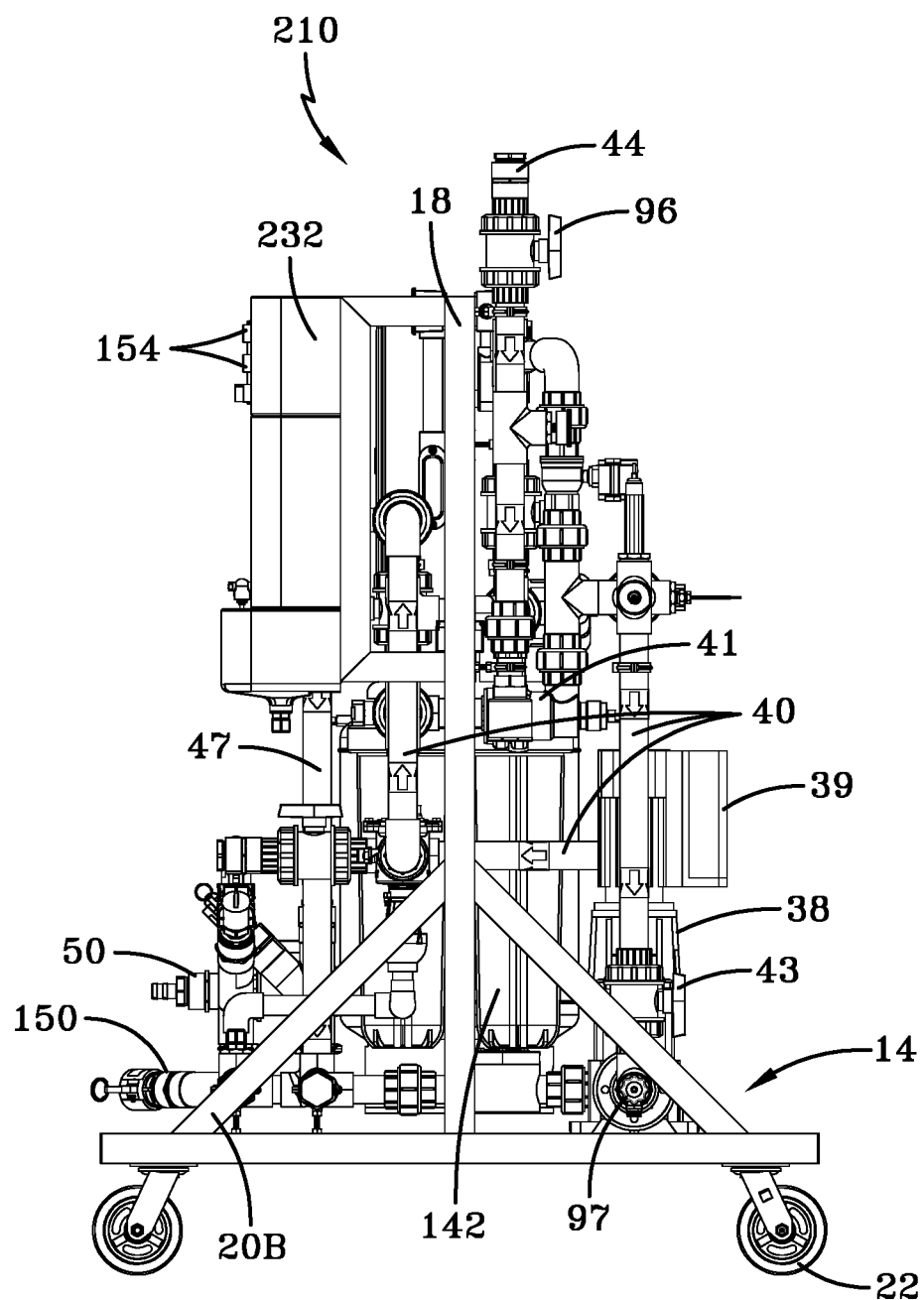
FIG. 18 is a left-side plan view thereof.
Figure 19:
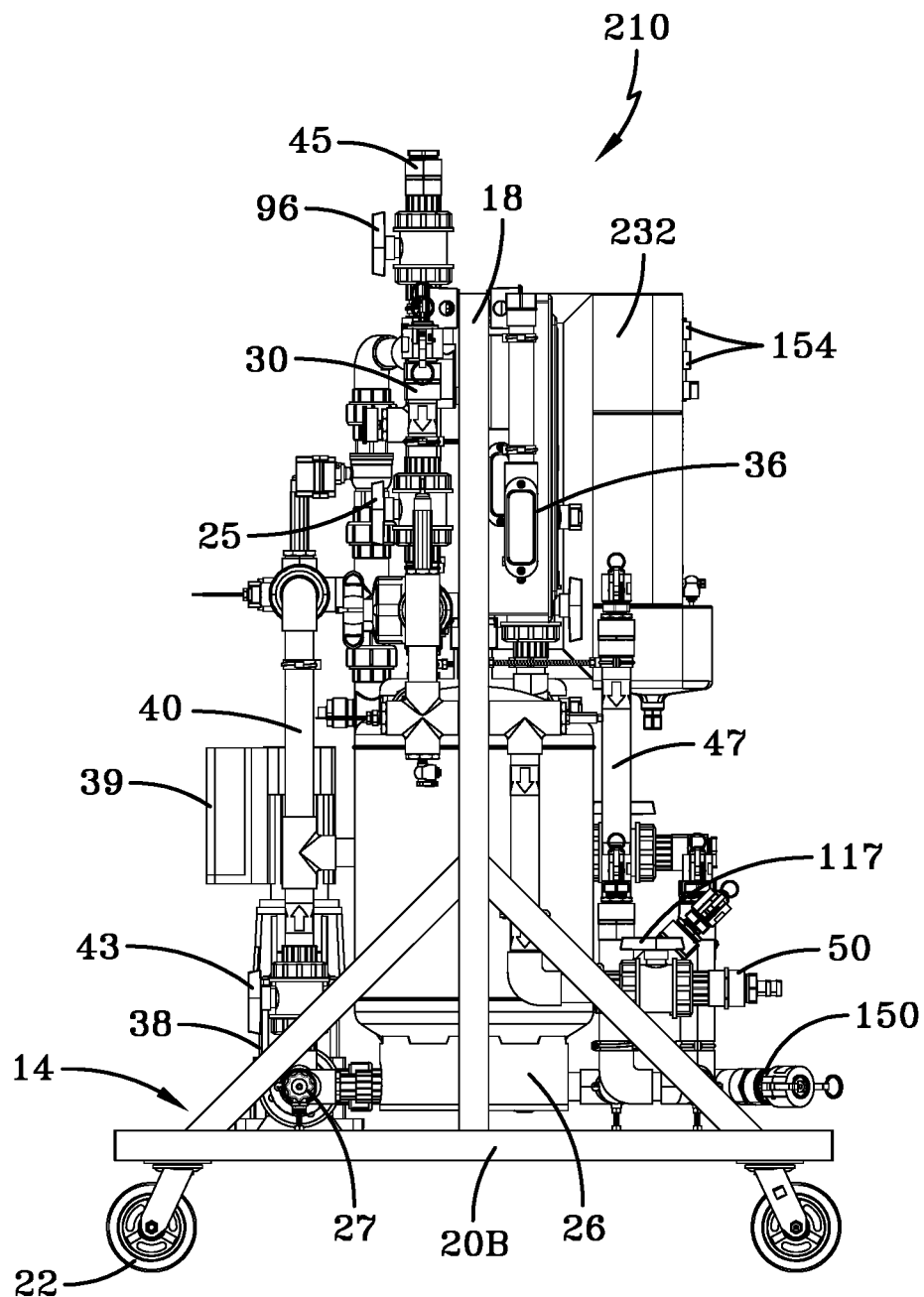
FIG. 19 is a right-side plan view thereof.

In FIG. 9, the frame 14 comprising an upper frame 18 and outer lower frame 20B of the transitional wall 10 is shown in proximity to the RO system 122 of the FIG. 8 embodiment, the RO system 122 comprising reverse osmosis filters 109 and an RO system monitoring frame 108. Also shown is the dialysate supply system 101 comprising a storage tank 112 of the FIG. 8 embodiment. Referring now to FIGS. 8 and 9, the pre-RO treated water output 50 may be positioned in close proximity to the sampling station 32, the sampling station 32 having sampling tubes 49 threaded through and leading from the interior frame 28 to apertures 73 of the sampling station 32. The pre-RO treated water output 50 may include a ball valve 117 permitting a user to control the flow rate of water being discharged from the pre-RO treated water output 50 to the RO system input 70. Referring specifically to FIG. 9, a sample drainage tube 61 may cause excess or rejected fluid from the sampling station 32 to be discharged into a drainage pipe 51.

As shown in FIG. 9, the RO system 122 may comprise a deionizer 134 for removing any excess ions from the water after reverse osmosis filtering. The deionizer 134 may be positioned downstream of the one or more reverse osmosis filters 109. A pre-deionization sampling faucet 135 may be positioned upstream of the deionizer 134, and a post-deionization sampling faucet 139 may be positioned downstream of the deionizer 134. These deionization sampling faucets 135, 139 may be positioned above a drainage apparatus 133, where the drainage apparatus 133 may be configured to cause excess or rejected fluid from the deionization sampling faucets 135, 139 to flow through a drainage hose 136 towards the drainage pipe 51. Water flowing from the deionizer 134 may be discharged into a purified water hose 131. The purified water hose 131 may transfer the purified water to a dialysate supply system 101 where purified water may be mixed with acid and base concentrates and electrolytes to form dialysate and thereafter distributed to dialysis machines.

Referring now to FIGS. 10-19, another exemplary transitional water treatment wall for dialysis 210 is shown, the transitional wall 210 comprising a mobile frame 14 including an upper frame 18, lower frame 20A-B linked to wheels 22, and an interior frame 28, 28A, a number of transitional wall devices (e.g., 25, 27, 41, 42, 43, 96, 97, 117), electrical outlets 24 connected by wire 21 to a circuit breaker 36, and a pre-RO treated water output 50. The inner lower frame 20A may comprise a plurality of beams positioned below the transitional wall devices, where certain beams intersect one another and provide base structural support to objects there above. In this particular embodiment, a water sampling station 232 is positioned to the rear of water input pipes 44, 45, and the water sampling station 232 is in fluid communication with a plurality of transition pipes 30 configured to connect with pre-RO treatment equipment. It will be apparent to one of ordinary skill in the art that an exemplary water sampling station may be positioned at any number of different locations across an exemplary transitional wall. One or more filters 142 may be positioned upstream of the transition pipes 30. The aforementioned filters 142 may comprise iron remover(s), particle filter(s), some combination thereof, or the like. The aforementioned filters 142 may be configured to reduce the risk of downstream fouling in pre-RO treatment equipment and/or RO-treatment equipment.

FIGS. 10-19 further show pressure pipes 229 in fluid communication with a booster pump 38 (controlled by motor 39) and pre-treatment pipes 40. The pressure pipes 229 may cause water pressure in devices of the transitional wall 210 to be altered by supplying pressurized fluid through a series pressure input 231. In the particular embodiment shown, the series pressure input 231 is positioned upstream of and in close proximity to the booster pump 38. A pressure tank housing 148 is also shown, where a pressure tank 26 has not been positioned thereon. In this particular embodiment, there are four pressure tank housings 148, only one of which is visible, and three pressure tanks 26. It will be apparent to one of ordinary skill in the art that any number of different pressure tanks and/or pressure tank housings may be included on an exemplary transitional wall without departing from the scope of the present invention. It will further be apparent to one of ordinary skill in the art that any number of different devices or methods may be employed for controlling pressure or temperature of fluid in transitional wall devices without departing from the scope of the present invention.

FIGS. 10-19 also show a discharge apparatus 144 positioned above an air gap 146. The discharge apparatus 144 may be configured to cause excess or rejected fluid from the transitional wall 210 upstream of the transition pipes 30 to be removed from the transitional wall 210. The excess or rejected fluid may be discharged from the discharge apparatus 144 through the air gap 146 into a drainage system 47. The air gap 146 may be configured to prevent particulates, pathogens, other contaminants, backflow, or the like from the drainage system 47 from entering the transitional wall 210. The drainage system 47 may include one or more exit points 150 providing for fluid therein to be discharged into a waste pipe, sewage drain, or the like.

In the embodiment shown, the water sampling station 232 comprises a digital interface 152 for displaying data on fluid characteristics, including by way of example and not limitation, water pressure and temperature, for water in each of a plurality of locations across the transitional wall 210. One or more buttons 154 may be configured to allow a user to view or toggle between each of any number of different fluid characteristic or related data displays. The water sampling station 232 may be in electronic communication with one or more processors (not shown) configured to cause the digital interface 152 to express data on fluid characteristics and/or related data. The one or more processors may be configured to cause, when certain issues have been detected including by way of example and not limitation, water pressure or temperature occurring outside of a predetermined range, an alert to be sent to one or more users, an alarm to go off in the treatment room, some combination thereof, or the like. By way of example and not limitation, an alert may be sent to one or more users and an alarm may go off in the treatment room when one or more pressure sensors communicate to the processor(s) a fluid pressure in at least one transitional wall device that is below 30 PSI or above 80 PSI. The one or more processor may further be configured to communicate data on fluid characteristics and/or related data to one or more electronic storage devices (not shown). It will be apparent to one of ordinary skill in the art that there may be any number of different ways to link one or more processors and/or electronic storage devices to an exemplary water sampling station without departing from the scope of the present invention.

In an exemplary embodiment, the water sampling station 232 comprises a central information assembly and an interface thereof, which may be in communication with a number of pressure transducer sensors. The central information assembly may be configured to log (store), backup and communicate, and the interface thereof may be configured to display, by way of example and not limitation, water pressure data, water chemistry data, water temperature data, biological and/or biochemical data related to the water, water flow rate data, some combination thereof, or the like for water sampled across any number of locations in or in proximity to the transitional wall. In an exemplary embodiment, the central information assembly interface may display water pressure and calculated delta pressure for each location across the transitional wall from which water samples are collected and transported to the water sampling station 232 for testing. The central information assembly may comprise an analog backup to preserve data in the event of an electrical failure, component failure, PLC-HMI failure, some combination thereof, or the like. It will be apparent to one of ordinary skill in the art that the present invention is not intended to necessarily be limited to a single interface, and a central information assembly interface may be configured at any number of different locations, including by way of example and not limitation, locations remote with respect to the transitional wall.

It will be appreciated by those skilled in the art that the present invention can be embodied in other specific forms without departing from the spirit or essential characteristics thereof. In particular, it will be appreciated by those skilled in the art that although embodiments specific to dialysis have been described, the present invention may be useful to any number of different endeavors involving water purification. The presently disclosed embodiments are considered in all respects to be illustrative and not restricted. The scope of the invention is indicated by the appended claims rather than the foregoing description and all the changes that come within the meaning and range and equivalence thereof are intended to be embraced therein.

What is claimed is:

1. An apparatus for promoting water treatment for dialysis, comprising:
a mobile transitional water treatment wall frame comprising:
a first group of wheels;
a second group of wheels;
a pair of vertical beams;
a plurality of horizontal beams, each extending parallel to one another between the vertical beams and the first and second groups of wheels, the plurality of horizontal beams comprising:
a first horizontal beam configured to provide base support to one or more transitional wall devices;
a second horizontal beam positioned above the first horizontal beam, connected to at least one of the vertical beams, and configured to provide structural support to the frame; and
a third horizontal beam positioned above the second horizontal beam and connected to at least one of the vertical beams;
a plurality of pipes, including:
one or more water input pipes, attached to the third horizontal beam to provide hydraulic head for fluid flow downstream of the one or more water input pipes;
a plurality of transition pipes, the transition pipes connected to at least one of said plurality of horizontal beams, and configured to circulate water along a water treatment circuit, the water treatment circuit beginning at a non-purified water source output and ending at a reverse osmosis water purification system input;
a pump, supported by the first horizontal beam, and configured to receive upstream flow from the one or more water input pipes and promote downstream flow through the transition pipes;
a water pressure control device adapted to permit regulation of water pressure in one or more of the plurality of pipes;
a sampling station, secured to the frame and comprising a plurality of faucets;
wherein multiple faucets of the plurality of faucets of the sampling station are each adapted to discharge water received from a different transition pipe; and
wherein the transition pipes are capable of connecting a plurality of pre-RO water treatment equipment devices to the water treatment circuit.

2. The apparatus of claim 1 further comprising:
a thermometer, adapted to measure water temperature in at least one of the plurality of pipes; and
a water pressure gauge, adapted to measure water pressure in at least one of the plurality of pipes.

3. The apparatus of claim 1, wherein:
the one or more water input pipes include a cold-water input pipe and a hot-water input pipe; and
wherein a water temperature control device is positioned above the pump, between the second and third horizontal beams, to permit temperature control of water upstream of the pump.

4. The apparatus of claim 1, wherein:
the water pressure control device comprises one or more pressure tanks, specifically configured to provide compressed fluid to a series pressure input for regulating water pressure in at least one of the plurality of pipes;
wherein the one or more pressure tanks are positioned above the first horizontal beam and below the second horizontal beam, and are structurally supported by at least one selected from the group of the first horizontal beam and the second horizontal beam.

5. The apparatus of claim 4, wherein:
each of the one or more pressure tanks extend substantially the distance from the first horizontal beam to the second horizontal beam; and
the transition pipes are positioned above the second horizontal beam and below the third horizontal beam.

6. The apparatus of claim 1, further comprising:
a sampling station delivery tube;
wherein the sampling station delivery tube is configured to establish fluid communication between at least one of the transition pipes and a faucet of the plurality of faucets of the sampling station;
wherein at least one of the plurality of horizontal beams comprises a dry channel and a plurality of apertures configured to permit the sampling station delivery tube to be positioned in the dry channel; and
wherein the sampling station is secured to the third horizontal beam.

7. The apparatus of claim 6, wherein:
the sampling station delivery tube further comprises a first end and a second end;
wherein the first end of the sampling station delivery tube is attached to a transition pipe aperture;
wherein the second end of the sampling station delivery tube is attached to the faucet of the plurality of faucets of the sampling station;
wherein a length of the sampling station delivery tube extends along the dry channel; and
wherein the sampling station delivery tube is threaded through at least two of the plurality of apertures.

8. The apparatus of claim 1, wherein:
each the first group and the second group of wheels are positioned substantially below a truss member adapted to provide base support to the frame.

9. The apparatus of claim 8, wherein:
a plurality of intersecting beams are positioned between wheels and truss members on either side of the frame, and are configured to provide base structural support to objects there above.

10. The apparatus of claim 1 wherein:
the transition pipes are positioned above the second horizontal beam, and are configured to receive a plurality of connection hoses each capable of establishing fluid communication between the transition pipes and a pre-RO treatment device extending above the second horizontal beam.

11. The apparatus of claim 1 further comprising:
a drainage pipe extending at least half the distance between the first group and second group of wheels, adapted to transport excess and rejected fluid away from the apparatus.

12. The apparatus of claim 1 further comprising:
an electrical outlet, positioned on the third horizontal beam;
a circuit breaker, secured to the third horizontal beam; and
a wire;

wherein the wire establishes electronic communication between the circuit breaker and the electrical outlet; and wherein the sampling station further comprises a digital interface for displaying water pressure in at least one of the plurality of pipes.

13. An apparatus for promoting water treatment for dialysis, comprising:
a mobile transitional water treatment wall frame, comprising:
a first group of wheels;
a second group of wheels;
a pair of vertical beams;
a plurality of horizontal beams, each extending parallel to one another between the vertical beams and the first and second groups of wheels, the plurality of horizontal beams comprising:
a first horizontal beam configured to provide base support to one or more transitional wall devices;
a second horizontal beam positioned at least two feet above the first horizontal beam, attached to at least one of the vertical beams and configured to provide structural support to the frame;
a third horizontal beam positioned at least two feet above the second horizontal beam and attached to at least one of the vertical beams; and
a fourth horizontal beam positioned above the second horizontal beam and below the third horizontal beam;
a plurality of pipes including:
one or more water input pipes, attached to the third horizontal beam to provide hydraulic head for fluid flow downstream of the one or more water input pipes;
a plurality of transition pipes, the transition pipes positioned above the second horizontal beam and below the third horizontal beam, and connected to the fourth horizontal beam, wherein the transition pipes are configured to circulate water along a circuit beginning at a non-purified water source output and ending at a reverse osmosis water purification system input;
a water pressure control device comprising one or more pressure tanks, specifically configured to provide compressed fluid to a series pressure input for regulating water pressure in one or more of the plurality of pipes, wherein each of the one or more pressure tanks are supported by at least one selected from the group of the first horizontal beam and the second horizontal beam, and extend substantially the distance between the first and second horizontal beams;
a pump, supported by the first horizontal beam, and configured to receive upstream flor from the one or more water input pipes and promote downstream flow through the transition pipes;
a sampling station, secured to the third horizontal beam and comprising a plurality of faucets;
a plurality of sampling station delivery tubes each comprising a first end and a second end, and adapted to permit the discharge of water from one or more of the plurality of pipes through a faucet of the plurality of faucets of the sampling station;
wherein the transition pipes are configured to receive a plurality of connection hoses each capable of establishing fluid communication between the transition pipes and a pre-RO treatment device extending above the second horizontal beam; wherein at least one faucet of the sampling station is in fluid communication with at least one of the transition pipes, wherein the fluid communication is established by at least one of the plurality of sampling station delivery tubes;
wherein at least one of the plurality of horizontal beams includes a dry channel and a plurality of apertures;
wherein the first end of the at least one of the plurality of flexible sampling station delivery tubes is attached to a transition pipe aperture of at least one of the transition pipes;
wherein the second end of the at least one of the plurality of sampling station delivery tubes is attached to the at least one faucet of the sampling station, and
wherein a length of the at least one of the plurality of sampling station delivery tubes extends along a length of the dry channel of the at least one of the plurality of horizontal beams, and is threaded through at least two of the plurality of apertures.

14. The apparatus of claim 13, further comprising:
an electric circuit breaker affixed to the third horizontal beam.

15. A method for assembling a transitional water treatment wall, comprising:
providing a mobile transitional water treatment wall frame comprising:
a first group of wheels;
a second group of wheels;
a pair of vertical beams;
a plurality of horizontal beams, each extending parallel to one another between the vertical beams and the first and second groups of wheels, the plurality of horizontal beams comprising:
a first horizontal beam configured to provide base support to one or more transitional wall devices;
a second horizontal beam positioned above the first horizontal beam, connected to at least one of the vertical beams and configured to provide structural support to the frame; and
a third horizontal beam positioned above the second horizontal beam, connected to at least one of the vertical beams;
providing a plurality of pipes including:
one or more water input pipes, attached to the third horizontal beam to provide hydraulic head for fluid flow downstream of the one or more water input pipes;
a plurality of transition pipes;
connecting the transition pipes to at least one of said plurality of horizontal beams, and configuring the transition pipes to be capable of circulating water along a circuit beginning at a non-purified water source output and ending at a reverse osmosis water purification system input;
providing a pump, connected to and supported by the first horizontal beam;
configuring the pump to receive upstream flow from the one or more water input pipes and to promote downstream flow through the transition pipes;
providing a water pressure control device, and configuring the water pressure control device to be capable of regulating water pressure in one or more of the plurality of pipes;
providing a sampling station comprising a plurality of faucets, and securing the sampling station to the frame;

configuring multiple faucets of the plurality of faucets of the sampling station to each be capable of discharging water from a different transition pipe; and configuring the transition pipes to be capable of connecting a plurality of pre-RO water treatment equipment devices to the circuit.

16. The method of claim 15, further comprising:

positioning the sampling station proximate to a corner of the frame and between the second horizontal beam and the third horizontal beam.

17. The method of claim 16, further comprising:

positioning an electrical outlet on the third horizontal beam;

securing a circuit breaker to the third horizontal beam;

providing a wire; and configuring the wire to establish electronic communication between the circuit breaker and the electrical outlet.

18. The method of claim 15, further comprising:

providing a sampling station delivery tube, adapted to establish fluid communication between at least one of the transition pipes and at least one faucet of the plurality of faucets of the sampling station;

providing a dry channel in and a plurality of apertures on at least one of the plurality of horizontal beams;

securing the sampling station delivery tube between the at least one of the transition pipes and the at least one faucet of the plurality of faucets by positioning the sampling station delivery tube through each of at least two apertures of the at least one of the plurality of horizontal beams, wherein a portion of the sampling station delivery tube is positioned in the dry channel.

* * * * *